(12) United States Patent
Jhang et al.

(10) Patent No.: US 12,032,134 B2
(45) Date of Patent: Jul. 9, 2024

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Fujian (CN); Baina Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 719 days.

(21) Appl. No.: 17/160,387

(22) Filed: Jan. 28, 2021

(65) Prior Publication Data
US 2022/0163767 A1 May 26, 2022

(30) Foreign Application Priority Data
Nov. 26, 2020 (CN) .......................... 202011353667.1

(51) Int. Cl.
*G02B 13/00* (2006.01)
*G02B 9/64* (2006.01)
*G02B 27/00* (2006.01)
*H04N 23/55* (2023.01)

(52) U.S. Cl.
CPC .......... *G02B 13/0045* (2013.01); *G02B 9/64* (2013.01); *G02B 27/0025* (2013.01); *H04N 23/55* (2023.01)

(58) Field of Classification Search
CPC .. G02B 13/0045; G02B 9/64; G02B 27/0025; G02B 13/18; G02B 13/0015
See application file for complete search history.

(56) References Cited

U.S. PATENT DOCUMENTS 10,018,807 B2 * 7/2018 Tang .................... G02B 9/64
2018/0188482 A1 * 7/2018 Jhang .................. G02B 9/64

* cited by examiner

*Primary Examiner* — Alicia M Harrington
(74) *Attorney, Agent, or Firm* — JCIPRNET

(57) ABSTRACT

An optical imaging lens, including a first lens element, a second lens element, a third lens element, a fourth lens element, a fifth lens element, a sixth lens element, and a seventh lens element sequentially arranged along an optical axis from an object side to an image side, is provided. Each of the first lens element to the seventh lens element includes an object-side surface and an image-side surface. An optical axis region of the object-side surface of the first lens element is convex. A periphery region of the image-side surface of the second lens element is concave. The fourth lens element has positive refracting power, and an optical axis region of the object-side surface of the fourth lens element is concave. An optical axis region of the image-side surface of the fifth lens element is convex.

18 Claims, 30 Drawing Sheets

| First embodiment | | | | | | |
|---|---|---|---|---|---|---|
| EFL = 6.060 mm, HFOV = 38.073°, TTL = 9.568 mm, Fno = 1.700, ImgH = 5.800 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.714 | | | |
| First lens element 1 | Object-side surface 15 | 2.966 | 0.775 | 1.545 | 55.987 | 10.590 |
| | Image-side surface 16 | 5.524 | 0.440 | | | |
| Second lens element 2 | Object-side surface 25 | 5.232 | 0.329 | 1.671 | 19.243 | -20.652 |
| | Image-side surface 26 | 3.712 | 0.145 | | | |
| Third lens element 3 | Object-side surface 35 | 25.081 | 0.776 | 1.545 | 55.987 | 10.671 |
| | Image-side surface 36 | -7.511 | 0.300 | | | |
| Fourth lens element 4 | Object-side surface 45 | -9.774 | 0.700 | 1.545 | 55.987 | 60.640 |
| | Image-side surface 46 | -7.738 | 0.337 | | | |
| Fifth lens element 5 | Object-side surface 55 | -1.955 | 0.479 | 1.671 | 19.243 | -20.626 |
| | Image-side surface 56 | -2.498 | 0.157 | | | |
| Sixth lens element 6 | Object-side surface 65 | 3.540 | 1.117 | 1.545 | 55.987 | 10.879 |
| | Image-side surface 66 | 7.779 | 1.522 | | | |
| Seventh lens element 7 | Object-side surface 75 | 5.054 | 1.364 | 1.650 | 21.451 | -7.647 |
| | Image-side surface 76 | 2.247 | 0.500 | | | |
| Filter 9 | Object-side surface 95 | Infinity | 0.210 | 1.517 | 64.167 | |
| | Image-side surface 96 | Infinity | 0.418 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 0.000000E+00 | 4.661331E-03 | -2.470318E-03 | 4.753128E-03 | -5.033325E-03 |
| 16 | 0.000000E+00 | -8.288669E-03 | -1.134059E-03 | 5.801597E-03 | -4.752831E-03 |
| 25 | 0.000000E+00 | -5.306276E-02 | -3.647254E-03 | 4.065031E-03 | 1.466151E-03 |
| 26 | 0.000000E+00 | -3.039835E-02 | -2.125600E-02 | 2.943492E-02 | -2.317622E-02 |
| 35 | 0.000000E+00 | 1.601365E-02 | -1.419058E-02 | 1.633523E-02 | -1.576996E-02 |
| 36 | 0.000000E+00 | -1.691126E-02 | 8.616059E-03 | -1.527871E-02 | 1.584136E-02 |
| 45 | 0.000000E+00 | -4.079264E-02 | 1.423995E-02 | -2.491460E-02 | 2.170226E-02 |
| 46 | -2.025447E+01 | -3.682692E-02 | 9.762157E-03 | 3.090650E-03 | -8.773062E-03 |
| 55 | -2.201571E+00 | -3.641432E-02 | 2.214389E-02 | 4.176898E-03 | -2.309870E-02 |
| 56 | -3.431696E-01 | -2.605407E-02 | 2.578657E-02 | -1.984680E-02 | 8.390829E-03 |
| 65 | 0.000000E+00 | -1.824199E-02 | -6.478738E-05 | -1.375764E-03 | 4.650660E-04 |
| 66 | 0.000000E+00 | 2.108438E-02 | -1.080088E-02 | 1.399290E-03 | 2.373064E-05 |
| 75 | -3.160280E+03 | -2.770984E-02 | -4.359461E-03 | 5.717938E-03 | -2.089845E-03 |
| 76 | -1.560371E+01 | -3.166088E-02 | 6.865319E-03 | -9.553202E-04 | 6.766725E-05 |
| Surface | $a_{12}$ | $a_{14}$ | $a_{16}$ | $a_{18}$ | $a_{20}$ |
| 15 | 3.235819E-03 | -9.837786E-04 | 1.151417E-04 | | |
| 16 | 2.437789E-03 | -7.059121E-04 | 8.979880E-05 | | |
| 25 | -1.515693E-03 | 4.007499E-04 | -3.663323E-05 | | |
| 26 | 1.135482E-02 | -3.040682E-03 | 3.471149E-04 | | |
| 35 | 7.693382E-03 | -1.833104E-03 | 1.777531E-04 | | |
| 36 | -9.075010E-03 | 2.609140E-03 | -2.947485E-04 | | |
| 45 | -1.166427E-02 | 3.166737E-03 | -3.285065E-04 | | |
| 46 | 4.696551E-03 | -1.040153E-03 | 8.323051E-05 | | |
| 55 | 1.786394E-02 | -6.381871E-03 | 1.190260E-03 | -1.114210E-04 | 4.014823E-06 |
| 56 | -1.954943E-03 | 2.970148E-04 | -3.344102E-05 | 2.465247E-06 | -8.045401E-08 |
| 65 | -3.760027E-05 | -6.272946E-06 | 1.359270E-06 | -9.829578E-08 | 3.138407E-09 |
| 66 | -2.473316E-05 | 2.167457E-06 | -9.446450E-10 | -8.535796E-09 | 3.283930E-10 |
| 75 | 4.005505E-04 | -4.400590E-05 | 2.788434E-06 | -9.490131E-08 | 1.343268E-09 |
| 76 | -1.256496E-06 | -1.255127E-07 | 8.852108E-09 | -2.233910E-10 | 2.063000E-12 |

FIG. 9

| Second embodiment | | | | | | |
|---|---|---|---|---|---|---|
| EFL = 5.468 mm, HFOV = 45.955°, TTL = 7.501 mm, Fno = 1.700, ImgH = 5.800 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.547 | | | |
| First lens element 1 | Object-side surface 15 | 2.764 | 0.703 | 1.545 | 55.987 | 9.535 |
| | Image-side surface 16 | 5.359 | 0.358 | | | |
| Second lens element 2 | Object-side surface 25 | 4.537 | 0.320 | 1.671 | 19.243 | -28.598 |
| | Image-side surface 26 | 3.571 | 0.128 | | | |
| Third lens element 3 | Object-side surface 35 | 11.625 | 0.697 | 1.545 | 55.987 | 9.565 |
| | Image-side surface 36 | -9.289 | 0.260 | | | |
| Fourth lens element 4 | Object-side surface 45 | -18.701 | 0.657 | 1.545 | 55.987 | 42.566 |
| | Image-side surface 46 | -10.494 | 0.261 | | | |
| Fifth lens element 5 | Object-side surface 55 | -2.015 | 0.471 | 1.671 | 19.243 | -25.750 |
| | Image-side surface 56 | -2.493 | 0.065 | | | |
| Sixth lens element 6 | Object-side surface 65 | 3.244 | 0.893 | 1.545 | 55.987 | 10.061 |
| | Image-side surface 66 | 7.146 | 0.840 | | | |
| Seventh lens element 7 | Object-side surface 75 | 4.244 | 0.610 | 1.650 | 21.451 | -6.517 |
| | Image-side surface 76 | 2.007 | 0.500 | | | |
| Filter 9 | Object-side surface 95 | Infinity | 0.210 | 1.517 | 64.167 | |
| | Image-side surface 96 | Infinity | 0.527 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 0.000000E+00 | 9.067359E-04 | -7.836628E-04 | 4.810825E-03 | -5.221863E-03 |
| 16 | 0.000000E+00 | -9.739279E-03 | -9.884620E-04 | 5.756244E-03 | -4.730939E-03 |
| 25 | 0.000000E+00 | -5.355452E-02 | -4.013123E-03 | 4.120598E-03 | 1.423432E-03 |
| 26 | 0.000000E+00 | -3.399264E-02 | -2.101305E-02 | 2.933264E-02 | -2.320202E-02 |
| 35 | 0.000000E+00 | 1.349140E-02 | -1.552438E-02 | 1.621818E-02 | -1.578565E-02 |
| 36 | 0.000000E+00 | -1.776976E-02 | 8.254234E-03 | -1.577650E-02 | 1.573622E-02 |
| 45 | 0.000000E+00 | -4.225401E-02 | 1.265916E-02 | -2.442918E-02 | 2.166340E-02 |
| 46 | 1.133348E+01 | -4.320479E-02 | 9.568029E-03 | 2.972783E-03 | -8.765220E-03 |
| 55 | -2.846434E+00 | -3.380944E-02 | 2.300866E-02 | 4.171716E-03 | -2.313132E-02 |
| 56 | -6.897782E-01 | -2.216243E-02 | 2.707335E-02 | -1.971980E-02 | 8.395924E-03 |
| 65 | 0.000000E+00 | -2.165734E-02 | -1.141045E-03 | -1.402156E-03 | 4.679595E-04 |
| 66 | 0.000000E+00 | 2.404205E-02 | -1.160730E-02 | 1.402336E-03 | 2.494155E-05 |
| 75 | -3.498514E+01 | -3.664333E-02 | -3.895206E-03 | 5.742015E-03 | -2.090026E-03 |
| 76 | -6.374908E+00 | -3.306967E-02 | 6.837013E-03 | -9.545560E-04 | 6.762864E-05 |
| Surface | $a_{12}$ | $a_{14}$ | $a_{16}$ | $a_{18}$ | $a_{20}$ |
| 15 | 3.200904E-03 | -9.785577E-04 | 1.219572E-04 | | |
| 16 | 2.425873E-03 | -7.115010E-04 | 9.421992E-05 | | |
| 25 | -1.507708E-03 | 4.045519E-04 | -4.017126E-05 | | |
| 26 | 1.134972E-02 | -3.041784E-03 | 3.452848E-04 | | |
| 35 | 7.690127E-03 | -1.846668E-03 | 1.778033E-04 | | |
| 36 | -9.071139E-03 | 2.614584E-03 | -2.953505E-04 | | |
| 45 | -1.161687E-02 | 3.163377E-03 | -3.352066E-04 | | |
| 46 | 4.697782E-03 | -1.038681E-03 | 8.374291E-05 | | |
| 55 | 1.787149E-02 | -6.379557E-03 | 1.190663E-03 | -1.113881E-04 | 4.004675E-06 |
| 56 | -1.953592E-03 | 2.967599E-04 | -3.352133E-05 | 2.460709E-06 | -7.572553E-08 |
| 65 | -3.707698E-05 | -6.308513E-06 | 1.351706E-06 | -9.861365E-08 | 3.306441E-09 |
| 66 | -2.465318E-05 | 2.175451E-06 | 2.319920E-10 | -8.545037E-09 | 3.075830E-10 |
| 75 | 4.004177E-04 | -4.401028E-05 | 2.788217E-06 | -9.489515E-08 | 1.346665E-09 |
| 76 | -1.255951E-06 | -1.255560E-07 | 8.852428E-09 | -2.233100E-10 | 2.063000E-12 |

FIG. 13

| Third embodiment | | | | | | |
|---|---|---|---|---|---|---|
| EFL = 5.490 mm, HFOV = 45.742°, TTL = 7.548 mm, Fno = 1.700, ImgH = 5.800 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.555 | | | |
| First lens element 1 | Object-side surface 15 | 2.772 | 0.655 | 1.545 | 55.987 | 9.743 |
| | Image-side surface 16 | 5.303 | 0.357 | | | |
| Second lens element 2 | Object-side surface 25 | 4.512 | 0.298 | 1.671 | 19.243 | -29.073 |
| | Image-side surface 26 | 3.573 | 0.129 | | | |
| Third lens element 3 | Object-side surface 35 | 11.584 | 0.626 | 1.545 | 55.987 | 9.531 |
| | Image-side surface 36 | -9.277 | 0.251 | | | |
| Fourth lens element 4 | Object-side surface 45 | -19.200 | 0.690 | 1.545 | 55.987 | 41.968 |
| | Image-side surface 46 | -10.582 | 0.320 | | | |
| Fifth lens element 5 | Object-side surface 55 | -2.007 | 0.513 | 1.671 | 19.243 | -25.141 |
| | Image-side surface 56 | -2.510 | 0.132 | | | |
| Sixth lens element 6 | Object-side surface 65 | 3.180 | 0.923 | 1.545 | 55.987 | 9.684 |
| | Image-side surface 66 | 7.154 | 0.840 | | | |
| Seventh lens element 7 | Object-side surface 75 | 4.329 | 0.592 | 1.650 | 21.451 | -6.317 |
| | Image-side surface 76 | 2.001 | 0.500 | | | |
| Filter 9 | Object-side surface 95 | Infinity | 0.210 | 1.517 | 64.167 | |
| | Image-side surface 96 | Infinity | 0.511 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | 0.000000E+00 | 1.060462E-03 | -7.307351E-04 | 4.820027E-03 | -5.220133E-03 |
| 16 | 0.000000E+00 | -9.103565E-03 | -9.822454E-04 | 5.754169E-03 | -4.733976E-03 |
| 25 | 0.000000E+00 | -5.358622E-02 | -3.974875E-03 | 4.139483E-03 | 1.430528E-03 |
| 26 | 0.000000E+00 | -3.397403E-02 | -2.101356E-02 | 2.933379E-02 | -2.320075E-02 |
| 35 | 0.000000E+00 | 1.369258E-02 | -1.550753E-02 | 1.621331E-02 | -1.578906E-02 |
| 36 | 0.000000E+00 | -1.772451E-02 | 8.213935E-03 | -1.577487E-02 | 1.573981E-02 |
| 45 | 0.000000E+00 | -4.298556E-02 | 1.249621E-02 | -2.443603E-02 | 2.165944E-02 |
| 46 | 1.044271E+01 | -4.296694E-02 | 9.676325E-03 | 2.952543E-03 | -8.770842E-03 |
| 55 | -2.869913E+00 | -3.423339E-02 | 2.311757E-02 | 4.186675E-03 | -2.313099E-02 |
| 56 | -6.785192E-01 | -2.236533E-02 | 2.705179E-02 | -1.971948E-02 | 8.396047E-03 |
| 65 | 0.000000E+00 | -2.154698E-02 | -1.132559E-03 | -1.396915E-03 | 4.689425E-04 |
| 66 | 0.000000E+00 | 2.391205E-02 | -1.161645E-02 | 1.402840E-03 | 2.518718E-05 |
| 75 | -3.596272E+01 | -3.654868E-02 | -3.897016E-03 | 5.741553E-03 | -2.090056E-03 |
| 76 | -6.279840E+00 | -3.311613E-02 | 6.837421E-03 | -9.542784E-04 | 6.763961E-05 |
| Surface | $a_{12}$ | $a_{14}$ | $a_{16}$ | $a_{18}$ | $a_{20}$ |
| 15 | 3.201816E-03 | -9.782543E-04 | 1.221336E-04 | | |
| 16 | 2.424034E-03 | -7.124057E-04 | 9.381494E-05 | | |
| 25 | -1.506266E-03 | 4.048653E-04 | -4.005763E-05 | | |
| 26 | 1.134939E-02 | -3.041483E-03 | 3.453910E-04 | | |
| 35 | 7.688450E-03 | -1.847266E-03 | 1.777630E-04 | | |
| 36 | -9.069626E-03 | 2.615096E-03 | -2.951849E-04 | | |
| 45 | -1.161834E-02 | 3.163037E-03 | -3.352920E-04 | | |
| 46 | 4.696864E-03 | -1.038843E-03 | 8.371406E-05 | | |
| 55 | 1.787146E-02 | -6.379574E-03 | 1.190656E-03 | -1.113900E-04 | 4.004212E-06 |
| 56 | -1.953566E-03 | 2.967653E-04 | -3.352028E-05 | 2.460874E-06 | -7.570195E-08 |
| 65 | -3.696345E-05 | -6.310566E-06 | 1.349418E-06 | -9.920916E-08 | 3.223290E-09 |
| 66 | -2.463485E-05 | 2.175442E-06 | 9.426300E-11 | -8.561720E-09 | 3.068870E-10 |
| 75 | 4.004166E-04 | -4.401032E-05 | 2.788217E-06 | -9.489508E-08 | 1.346673E-09 |
| 76 | -1.255782E-06 | -1.255573E-07 | 8.852089E-09 | -2.233380E-10 | 2.062000E-12 |

FIG. 17

| Fourth embodiment ||||||
|---|---|---|---|---|---|---|
| | EFL = 5.538 mm, HFOV = 45.283°, TTL = 7.530 mm, Fno = 1.700, ImgH = 5.800 mm |
| Element | Surface | Radius of curvature (mm) | Gap (mm) | Refractive index | Abbe number | Focal length (mm) |
| Object | | Infinity | Infinity | | | |
| Aperture 0 | | Infinity | -0.595 | | | |
| First lens element 1 | Object-side surface 15 | 2.750 | 0.809 | 1.545 | 55.987 | 9.266 |
| | Image-side surface 16 | 5.396 | 0.358 | | | |
| Second lens element 2 | Object-side surface 25 | 4.863 | 0.300 | 1.671 | 19.243 | -25.492 |
| | Image-side surface 26 | 3.700 | 0.120 | | | |
| Third lens element 3 | Object-side surface 35 | 14.649 | 0.515 | 1.545 | 55.987 | 9.716 |
| | Image-side surface 36 | -8.219 | 0.322 | | | |
| Fourth lens element 4 | Object-side surface 45 | -14.649 | 0.584 | 1.545 | 55.987 | 43.195 |
| | Image-side surface 46 | -9.165 | 0.183 | | | |
| Fifth lens element 5 | Object-side surface 55 | -2.205 | 0.371 | 1.671 | 19.243 | -19.062 |
| | Image-side surface 56 | -2.840 | 0.039 | | | |
| Sixth lens element 6 | Object-side surface 65 | 4.628 | 1.319 | 1.545 | 55.987 | 8.430 |
| | Image-side surface 66 | -855.015 | 0.960 | | | |
| Seventh lens element 7 | Object-side surface 75 | 5.484 | 0.508 | 1.567 | 37.490 | -6.182 |
| | Image-side surface 76 | 2.073 | 0.500 | | | |
| Filter 9 | Object-side surface 95 | Infinity | 0.210 | 1.517 | 64.167 | |
| | Image-side surface 96 | Infinity | 0.432 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 0.000000E+00 | 3.219095E-03 | -9.199745E-04 | 4.805456E-03 | -5.194831E-03 |
| 16 | 0.000000E+00 | -6.321512E-03 | -4.589725E-04 | 5.852033E-03 | -4.767465E-03 |
| 25 | 0.000000E+00 | -5.417426E-02 | -4.225852E-03 | 4.167278E-03 | 1.451925E-03 |
| 26 | 0.000000E+00 | -3.382508E-02 | -2.098951E-02 | 2.938898E-02 | -2.319169E-02 |
| 35 | 0.000000E+00 | 1.336293E-02 | -1.501969E-02 | 1.632310E-02 | -1.583541E-02 |
| 36 | 0.000000E+00 | -1.158319E-02 | 8.239178E-03 | -1.563224E-02 | 1.577501E-02 |
| 45 | 0.000000E+00 | -3.971205E-02 | 1.495556E-02 | -2.442963E-02 | 2.162707E-02 |
| 46 | 1.896704E+01 | -5.256663E-02 | 1.129510E-02 | 3.012307E-03 | -8.783242E-03 |
| 55 | -3.231317E+00 | -3.174829E-02 | 2.297956E-02 | 4.202796E-03 | -2.312378E-02 |
| 56 | -5.882853E-01 | -2.217268E-02 | 2.704563E-02 | -1.972536E-02 | 8.394277E-03 |
| 65 | 0.000000E+00 | -3.085642E-02 | -5.854253E-04 | -1.231090E-03 | 4.624386E-04 |
| 66 | 0.000000E+00 | 2.711737E-02 | -1.155290E-02 | 1.398530E-03 | 2.418446E-05 |
| 75 | -3.670974E+02 | -3.763416E-02 | -3.915795E-03 | 5.742077E-03 | -2.089977E-03 |
| 76 | -6.726294E+00 | -3.351190E-02 | 6.842942E-03 | -9.542441E-04 | 6.763552E-05 |
| Surface | $a_{12}$ | $a_{14}$ | $a_{16}$ | $a_{18}$ | $a_{20}$ |
| 15 | 3.199761E-03 | -9.782587E-04 | 1.228022E-04 | | |
| 16 | 2.427242E-03 | -7.199262E-04 | 1.034594E-04 | | |
| 25 | -1.518536E-03 | 3.974573E-04 | -4.164538E-05 | | |
| 26 | 1.135055E-02 | -3.042682E-03 | 3.447671E-04 | | |
| 35 | 7.661229E-03 | -1.847599E-03 | 1.841584E-04 | | |
| 36 | -9.065328E-03 | 2.615860E-03 | -2.952615E-04 | | |
| 45 | -1.162752E-02 | 3.156499E-03 | -3.380040E-04 | | |
| 46 | 4.695204E-03 | -1.039985E-03 | 8.302561E-05 | | |
| 55 | 1.787225E-02 | -6.379579E-03 | 1.190652E-03 | -1.113798E-04 | 4.011015E-06 |
| 56 | -1.953641E-03 | 2.967844E-04 | -3.351805E-05 | 2.460118E-06 | -7.626342E-08 |
| 65 | -3.946635E-05 | -6.574191E-06 | 1.325450E-06 | -1.078734E-07 | -2.216800E-11 |
| 66 | -2.464255E-05 | 2.176811E-06 | 5.506700E-11 | -8.569355E-09 | 3.072710E-10 |
| 75 | 4.004222E-04 | -4.400999E-05 | 2.788231E-06 | -9.489422E-08 | 1.346760E-09 |
| 76 | -1.255984E-06 | -1.255618E-07 | 8.852213E-09 | -2.233150E-10 | 2.065000E-12 |

FIG. 21

| Fifth embodiment | | | | | | |
|---|---|---|---|---|---|---|
| EFL = 5.617 mm, HFOV = 44.857°, TTL = 7.302 mm, Fno = 1.700, ImgH = 5.800 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.616 | | | |
| First lens element 1 | Object-side surface 15 | 2.694 | 0.878 | 1.545 | 55.987 | 8.718 |
| | Image-side surface 16 | 5.488 | 0.363 | | | |
| Second lens element 2 | Object-side surface 25 | 4.697 | 0.300 | 1.671 | 19.243 | -30.632 |
| | Image-side surface 26 | 3.731 | 0.188 | | | |
| Third lens element 3 | Object-side surface 35 | 19.722 | 0.467 | 1.545 | 55.987 | 11.572 |
| | Image-side surface 36 | -9.226 | 0.040 | | | |
| Fourth lens element 4 | Object-side surface 45 | -23.211 | 0.692 | 1.545 | 55.987 | 24.350 |
| | Image-side surface 46 | -8.545 | 0.113 | | | |
| Fifth lens element 5 | Object-side surface 55 | -3.694 | 0.358 | 1.671 | 19.243 | -25.977 |
| | Image-side surface 56 | -4.859 | 0.379 | | | |
| Sixth lens element 6 | Object-side surface 65 | 4.161 | 0.977 | 1.545 | 55.987 | 11.601 |
| | Image-side surface 66 | 11.108 | 0.872 | | | |
| Seventh lens element 7 | Object-side surface 75 | 13.015 | 0.528 | 1.567 | 37.490 | -5.863 |
| | Image-side surface 76 | 2.620 | 0.500 | | | |
| Filter 9 | Object-side surface 95 | Infinity | 0.210 | 1.517 | 64.167 | |
| | Image-side surface 96 | Infinity | 0.438 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 0.000000E+00 | 2.456570E-03 | -1.680376E-03 | 4.889313E-03 | -5.211577E-03 |
| 16 | 0.000000E+00 | -6.943177E-03 | -5.906252E-04 | 5.710702E-03 | -4.639370E-03 |
| 25 | 0.000000E+00 | -5.151624E-02 | -4.806676E-03 | 4.084908E-03 | 1.284841E-03 |
| 26 | 0.000000E+00 | -3.304661E-02 | -2.100886E-02 | 2.943593E-02 | -2.315325E-02 |
| 35 | 0.000000E+00 | 1.017047E-02 | -1.518336E-02 | 1.620160E-02 | -1.584648E-02 |
| 36 | 0.000000E+00 | -1.536734E-02 | 9.204161E-03 | -1.558335E-02 | 1.575663E-02 |
| 45 | 0.000000E+00 | -3.583340E-02 | 2.160843E-02 | -2.404804E-02 | 2.160579E-02 |
| 46 | 1.647047E+01 | -4.568824E-02 | 1.483332E-02 | 2.816505E-03 | -8.761699E-03 |
| 55 | -3.219346E+00 | -3.141605E-02 | 2.334479E-02 | 4.149383E-03 | -2.312966E-02 |
| 56 | 5.439861E-01 | -2.389694E-02 | 2.689299E-02 | -1.974982E-02 | 8.390892E-03 |
| 65 | 0.000000E+00 | -2.082326E-02 | -2.367763E-03 | -1.489454E-03 | 4.327409E-04 |
| 66 | 0.000000E+00 | 2.558221E-02 | -1.173987E-02 | 1.382188E-03 | 2.538807E-05 |
| 75 | -1.437495E+02 | -3.806133E-02 | -3.738398E-03 | 5.738775E-03 | -2.090051E-03 |
| 76 | -5.131280E+00 | -3.526469E-02 | 6.834744E-03 | -9.536864E-04 | 6.768819E-05 |
| Surface | $a_{12}$ | $a_{14}$ | $a_{16}$ | $a_{18}$ | $a_{20}$ |
| 15 | 3.212010E-03 | -9.708172E-04 | 1.182130E-04 | | |
| 16 | 2.377021E-03 | -7.386542E-04 | 1.171426E-04 | | |
| 25 | -1.479004E-03 | 4.039075E-04 | -3.372328E-05 | | |
| 26 | 1.135751E-02 | -3.047284E-03 | 3.410613E-04 | | |
| 35 | 7.657633E-03 | -1.851705E-03 | 1.821297E-04 | | |
| 36 | -9.061737E-03 | 2.618582E-03 | -2.926991E-04 | | |
| 45 | -1.164392E-02 | 3.157743E-03 | -3.349926E-04 | | |
| 46 | 4.686785E-03 | -1.040380E-03 | 8.347347E-05 | | |
| 55 | 1.787341E-02 | -6.379434E-03 | 1.190601E-03 | -1.113924E-04 | 4.011337E-06 |
| 56 | -1.954217E-03 | 2.967516E-04 | -3.351922E-05 | 2.461607E-06 | -7.615583E-08 |
| 65 | -3.819731E-05 | -5.178975E-06 | 1.238862E-06 | -1.329638E-07 | -3.925586E-09 |
| 66 | -2.444991E-05 | 2.179944E-06 | -3.857830E-10 | -8.525362E-09 | 3.066620E-10 |
| 75 | 4.004348E-04 | -4.400931E-05 | 2.788251E-06 | -9.489775E-08 | 1.346260E-09 |
| 76 | -1.254523E-06 | -1.255515E-07 | 8.848716E-09 | -2.234480E-10 | 2.070000E-12 |

FIG. 25

| Sixth embodiment ||||||
|---|---|---|---|---|---|
| EFL = 5.547 mm, HFOV = 44.398°, TTL = 7.737 mm, Fno = 1.700, ImgH = 5.800 mm ||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.577 | | | |
| First lens element 1 | Object-side surface 15 | 2.826 | 0.685 | 1.545 | 55.987 | 11.360 |
| | Image-side surface 16 | 4.746 | 0.264 | | | |
| Second lens element 2 | Object-side surface 25 | 4.156 | 0.300 | 1.671 | 19.243 | -44.343 |
| | Image-side surface 26 | 3.544 | 0.208 | | | |
| Third lens element 3 | Object-side surface 35 | 11.257 | 0.696 | 1.545 | 55.987 | 8.766 |
| | Image-side surface 36 | -8.152 | 0.582 | | | |
| Fourth lens element 4 | Object-side surface 45 | -7.709 | 0.777 | 1.545 | 55.987 | 51.394 |
| | Image-side surface 46 | -6.264 | 0.219 | | | |
| Fifth lens element 5 | Object-side surface 55 | -2.041 | 0.420 | 1.671 | 19.243 | -37.149 |
| | Image-side surface 56 | -2.406 | 0.019 | | | |
| Sixth lens element 6 | Object-side surface 65 | 3.308 | 0.805 | 1.545 | 55.987 | 11.521 |
| | Image-side surface 66 | 6.372 | 1.089 | | | |
| Seventh lens element 7 | Object-side surface 75 | 4.612 | 0.585 | 1.650 | 21.451 | -5.827 |
| | Image-side surface 76 | 1.984 | 0.500 | | | |
| Filter 9 | Object-side surface 95 | Infinity | 0.210 | 1.517 | 64.167 | |
| | Image-side surface 96 | Infinity | 0.378 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | 0.000000E+00 | 1.488894E-03 | -1.335105E-03 | 5.188207E-03 | -5.280939E-03 |
| 16 | 0.000000E+00 | -1.237986E-02 | -3.256972E-05 | 5.678782E-03 | -4.738656E-03 |
| 25 | 0.000000E+00 | -5.329510E-02 | -4.320956E-03 | 4.226628E-03 | 1.279052E-03 |
| 26 | 0.000000E+00 | -3.118938E-02 | -2.113008E-02 | 2.920480E-02 | -2.315543E-02 |
| 35 | 0.000000E+00 | 8.424524E-03 | -1.368806E-02 | 1.671555E-02 | -1.583795E-02 |
| 36 | 0.000000E+00 | -1.513091E-02 | 8.522296E-03 | -1.592254E-02 | 1.567566E-02 |
| 45 | 0.000000E+00 | -3.929506E-02 | 1.190387E-02 | -2.378246E-02 | 2.148715E-02 |
| 46 | 7.417465E+00 | -4.225686E-02 | 1.022633E-02 | 3.292367E-03 | -8.780191E-03 |
| 55 | -2.215151E+00 | -3.247879E-02 | 2.256717E-02 | 4.155571E-03 | -2.314466E-02 |
| 56 | -5.965045E-01 | -2.304485E-02 | 2.697515E-02 | -1.972102E-02 | 8.391324E-03 |
| 65 | 0.000000E+00 | -1.879229E-02 | -1.101756E-03 | -1.437567E-03 | 4.719684E-04 |
| 66 | 0.000000E+00 | 2.489105E-02 | -1.155065E-02 | 1.401399E-03 | 2.487910E-05 |
| 75 | -4.712124E+01 | -3.749729E-02 | -3.851771E-03 | 5.744968E-03 | -2.090300E-03 |
| 76 | -7.022995E+00 | -3.304325E-02 | 6.839246E-03 | -9.558194E-04 | 6.760462E-05 |
| Surface | $a_{12}$ | $a_{14}$ | $a_{16}$ | $a_{18}$ | $a_{20}$ |
| 15 | 3.182571E-03 | -9.710479E-04 | 1.264426E-04 | | |
| 16 | 2.463376E-03 | -6.897541E-04 | 9.079638E-05 | | |
| 25 | -1.560219E-03 | 4.066040E-04 | -3.375867E-05 | | |
| 26 | 1.133963E-02 | -3.066967E-03 | 3.695266E-04 | | |
| 35 | 7.703241E-03 | -1.831425E-03 | 1.771719E-04 | | |
| 36 | -9.029502E-03 | 2.631420E-03 | -3.048787E-04 | | |
| 45 | -1.177840E-02 | 3.166164E-03 | -3.395168E-04 | | |
| 46 | 4.660630E-03 | -1.040961E-03 | 8.430980E-05 | | |
| 55 | 1.787445E-02 | -6.379118E-03 | 1.190678E-03 | -1.114135E-04 | 3.998758E-06 |
| 56 | -1.954118E-03 | 2.967093E-04 | -3.352521E-05 | 2.460132E-06 | -7.555019E-08 |
| 65 | -3.633092E-05 | -6.327021E-06 | 1.346406E-06 | -9.890629E-08 | 3.262866E-09 |
| 66 | -2.464945E-05 | 2.172054E-06 | -3.976400E-10 | -8.571046E-09 | 3.167750E-10 |
| 75 | 4.004152E-04 | -4.401095E-05 | 2.788227E-06 | -9.487868E-08 | 1.345850E-09 |
| 76 | -1.252983E-06 | -1.254222E-07 | 8.853369E-09 | -2.234570E-10 | 2.064000E-12 |

FIG. 29

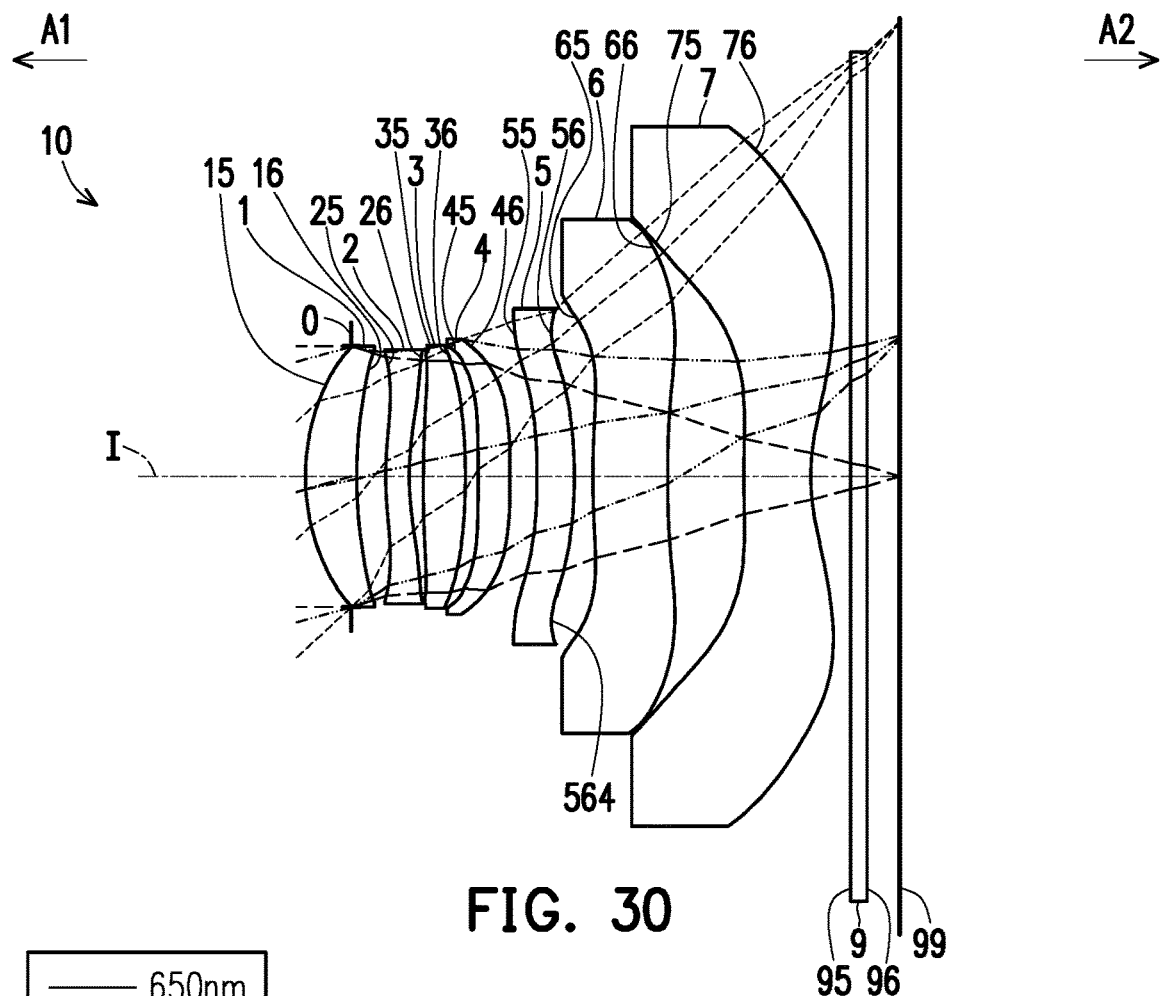
FIG. 30
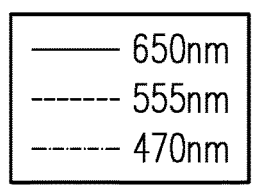
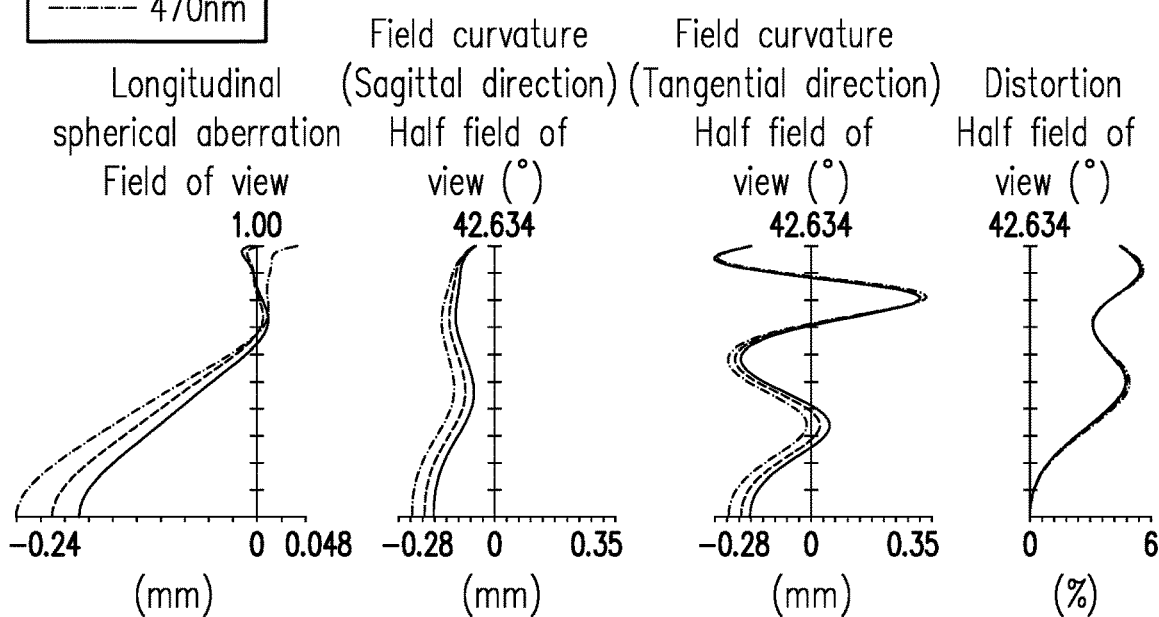
FIG. 31A    FIG. 31B    FIG. 31C    FIG. 31D

| Seventh embodiment | | | | | | |
|---|---|---|---|---|---|---|
| EFL = 5.668 mm, HFOV = 42.634°, TTL = 7.588 mm, Fno = 1.700, ImgH = 5.800 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.585 | | | |
| First lens element 1 | Object-side surface 15 | 2.791 | 0.654 | 1.545 | 55.987 | 9.318 |
| | Image-side surface 16 | 5.669 | 0.374 | | | |
| Second lens element 2 | Object-side surface 25 | 4.590 | 0.300 | 1.671 | 19.243 | -29.853 |
| | Image-side surface 26 | 3.642 | 0.180 | | | |
| Third lens element 3 | Object-side surface 35 | 24.993 | 0.537 | 1.545 | 55.987 | 11.989 |
| | Image-side surface 36 | -8.807 | 0.165 | | | |
| Fourth lens element 4 | Object-side surface 45 | -74.379 | 0.408 | 1.545 | 55.987 | 32.430 |
| | Image-side surface 46 | -14.335 | 0.346 | | | |
| Fifth lens element 5 | Object-side surface 55 | -8.915 | 0.469 | 1.671 | 19.243 | 42.883 |
| | Image-side surface 56 | -6.967 | 0.239 | | | |
| Sixth lens element 6 | Object-side surface 65 | 10.622 | 0.959 | 1.545 | 55.987 | 32.513 |
| | Image-side surface 66 | 25.581 | 0.974 | | | |
| Seventh lens element 7 | Object-side surface 75 | 14.222 | 0.855 | 1.650 | 21.451 | -5.133 |
| | Image-side surface 76 | 2.655 | 0.500 | | | |
| Filter 9 | Object-side surface 95 | Infinity | 0.210 | 1.517 | 64.167 | |
| | Image-side surface 96 | Infinity | 0.418 | | | |
| | Image plane 99 | Infinity | | | | |

FIG. 32

| Surface | K | $a_4$ | $a_6$ | $a_8$ | $a_{10}$ |
|---|---|---|---|---|---|
| 15 | 0.000000E+00 | -5.474062E-04 | -7.879247E-04 | 4.694781E-03 | -5.204510E-03 |
| 16 | 0.000000E+00 | -8.229104E-03 | -1.165032E-03 | 5.650095E-03 | -4.795833E-03 |
| 25 | 0.000000E+00 | -5.513750E-02 | -3.930790E-03 | 4.154468E-03 | 1.455137E-03 |
| 26 | 0.000000E+00 | -3.358897E-02 | -2.113706E-02 | 2.951480E-02 | -2.312789E-02 |
| 35 | 0.000000E+00 | 1.345425E-02 | -1.472770E-02 | 1.635054E-02 | -1.582838E-02 |
| 36 | 0.000000E+00 | -1.290630E-02 | 8.527559E-03 | -1.562660E-02 | 1.576876E-02 |
| 45 | 0.000000E+00 | -3.832061E-02 | 1.373472E-02 | -2.441098E-02 | 2.167001E-02 |
| 46 | 4.209768E+01 | -5.013896E-02 | 7.146413E-03 | 2.952974E-03 | -8.739282E-03 |
| 55 | 1.177932E+01 | -4.015552E-02 | 2.341524E-02 | 4.190560E-03 | -2.312722E-02 |
| 56 | 2.473574E+00 | -2.999655E-02 | 2.696982E-02 | -1.969720E-02 | 8.401212E-03 |
| 65 | 0.000000E+00 | -1.229450E-02 | -2.343668E-03 | -1.382459E-03 | 4.847053E-04 |
| 66 | 0.000000E+00 | 2.572757E-02 | -1.134457E-02 | 1.407456E-03 | 2.470602E-05 |
| 75 | -1.320294E+00 | -3.752903E-02 | -4.040038E-03 | 5.741358E-03 | -2.089953E-03 |
| 76 | -4.155089E+00 | -3.305161E-02 | 6.807245E-03 | -9.554478E-04 | 6.760427E-05 |
| Surface | $a_{12}$ | $a_{14}$ | $a_{16}$ | $a_{18}$ | $a_{20}$ |
| 15 | 3.198600E-03 | -9.792953E-04 | 1.218829E-04 | | |
| 16 | 2.442712E-03 | -7.036408E-04 | 9.251982E-05 | | |
| 25 | -1.523418E-03 | 3.990285E-04 | -3.900340E-05 | | |
| 26 | 1.136955E-02 | -3.041251E-03 | 3.433874E-04 | | |
| 35 | 7.666268E-03 | -1.843512E-03 | 1.868022E-04 | | |
| 36 | -9.069942E-03 | 2.616024E-03 | -2.928512E-04 | | |
| 45 | -1.160918E-02 | 3.163659E-03 | -3.369352E-04 | | |
| 46 | 4.696347E-03 | -1.041584E-03 | 8.259254E-05 | | |
| 55 | 1.787368E-02 | -6.379021E-03 | 1.190756E-03 | -1.113757E-04 | 4.004480E-06 |
| 56 | -1.952789E-03 | 2.968317E-04 | -3.352304E-05 | 2.458176E-06 | -7.602268E-08 |
| 65 | -3.619046E-05 | -6.351541E-06 | 1.356231E-06 | -8.949872E-08 | 6.590974E-09 |
| 66 | -2.464076E-05 | 2.176348E-06 | 4.967070E-10 | -8.561164E-09 | 3.066260E-10 |
| 75 | 4.004229E-04 | -4.400965E-05 | 2.788278E-06 | -9.489060E-08 | 1.346876E-09 |
| 76 | -1.253739E-06 | -1.255747E-07 | 8.851280E-09 | -2.233400E-10 | 2.067000E-12 |

FIG. 33

| Eighth embodiment ||||||
|---|---|---|---|---|---|---|
| EFL = 6.046 mm, HFOV = 42.021°, TTL = 8.511 mm, Fno = 1.700, ImgH = 5.800 mm |||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.709 | | | |
| First lens element 1 | Object-side surface 15 | 2.971 | 0.800 | 1.545 | 55.987 | 10.389 |
| | Image-side surface 16 | 5.642 | 0.348 | | | |
| Second lens element 2 | Object-side surface 25 | 4.274 | 0.373 | 1.671 | 19.243 | -29.415 |
| | Image-side surface 26 | 3.395 | 0.075 | | | |
| Third lens element 3 | Object-side surface 35 | 9.224 | 0.861 | 1.545 | 55.987 | 9.820 |
| | Image-side surface 36 | -12.398 | 0.216 | | | |
| Fourth lens element 4 | Object-side surface 45 | -21.432 | 0.897 | 1.545 | 55.987 | 54.565 |
| | Image-side surface 46 | -12.652 | 0.282 | | | |
| Fifth lens element 5 | Object-side surface 55 | -1.983 | 0.501 | 1.671 | 19.243 | -19.395 |
| | Image-side surface 56 | -2.573 | 0.017 | | | |
| Sixth lens element 6 | Object-side surface 65 | 3.508 | 1.101 | 1.545 | 55.987 | 11.054 |
| | Image-side surface 66 | 7.445 | 0.830 | | | |
| Seventh lens element 7 | Object-side surface 75 | 4.930 | 1.021 | 1.650 | 21.451 | -6.219 |
| | Image-side surface 76 | 2.048 | 0.500 | | | |
| Filter 9 | Object-side surface 95 | Infinity | 0.210 | 1.517 | 64.167 | |
| | Image-side surface 96 | Infinity | 0.479 | | | |
| | Image plane 99 | Infinity | | | | |

FIG. 36

| Surface | K | $a_4$ | $a_6$ | $a_8$ | $a_{10}$ |
|---|---|---|---|---|---|
| 15 | 0.000000E+00 | 2.774343E-03 | -1.873671E-03 | 4.918877E-03 | -5.046562E-03 |
| 16 | 0.000000E+00 | -1.123167E-02 | 9.344469E-04 | 5.757169E-03 | -4.746413E-03 |
| 25 | 0.000000E+00 | -5.123825E-02 | -3.550389E-03 | 4.097062E-03 | 1.395889E-03 |
| 26 | 0.000000E+00 | -3.326898E-02 | -2.097409E-02 | 2.929614E-02 | -2.321881E-02 |
| 35 | 0.000000E+00 | 1.511438E-02 | -1.449866E-02 | 1.651132E-02 | -1.568777E-02 |
| 36 | 0.000000E+00 | -1.526803E-02 | 8.387326E-03 | -1.584254E-02 | 1.573508E-02 |
| 45 | 0.000000E+00 | -4.219490E-02 | 1.305247E-02 | -2.413625E-02 | 2.174995E-02 |
| 46 | 5.763919E-01 | -4.201016E-02 | 1.003172E-02 | 3.142281E-03 | -8.716948E-03 |
| 55 | -2.770463E+00 | -3.265012E-02 | 2.330986E-02 | 4.161474E-03 | -2.314062E-02 |
| 56 | -6.402252E-01 | -2.296688E-02 | 2.690116E-02 | -1.972328E-02 | 8.397317E-03 |
| 65 | 0.000000E+00 | -2.127127E-02 | -1.573520E-03 | -1.347839E-03 | 4.855331E-04 |
| 66 | 0.000000E+00 | 2.311953E-02 | -1.157758E-02 | 1.404471E-03 | 2.511560E-05 |
| 75 | -1.013852E+02 | -3.554671E-02 | -3.847571E-03 | 5.742574E-03 | -2.089901E-03 |
| 76 | -6.495632E+00 | -3.342860E-02 | 6.876955E-03 | -9.534073E-04 | 6.764960E-05 |
| Surface | $a_{12}$ | $a_{14}$ | $a_{16}$ | $a_{18}$ | $a_{20}$ |
| 15 | 3.203660E-03 | -9.876669E-04 | 1.186274E-04 | | |
| 16 | 2.424556E-03 | -7.102096E-04 | 9.528123E-05 | | |
| 25 | -1.518023E-03 | 4.044301E-04 | -3.920126E-05 | | |
| 26 | 1.134956E-02 | -3.037784E-03 | 3.481837E-04 | | |
| 35 | 7.723104E-03 | -1.841098E-03 | 1.742679E-04 | | |
| 36 | -9.065182E-03 | 2.621438E-03 | -2.908519E-04 | | |
| 45 | -1.159963E-02 | 3.171857E-03 | -3.295156E-04 | | |
| 46 | 4.704507E-03 | -1.039548E-03 | 8.300009E-05 | | |
| 55 | 1.786713E-02 | -6.380537E-03 | 1.190538E-03 | -1.113848E-04 | 4.014810E-06 |
| 56 | -1.952917E-03 | 2.969114E-04 | -3.350223E-05 | 2.460529E-06 | -7.688922E-08 |
| 65 | -3.755497E-05 | -6.552055E-06 | 1.359362E-06 | -9.972724E-08 | 3.234986E-09 |
| 66 | -2.463365E-05 | 2.176940E-06 | 4.285370E-10 | -8.535955E-09 | 3.065620E-10 |
| 75 | 4.004344E-04 | -4.401035E-05 | 2.788193E-06 | -9.489638E-08 | 1.346038E-09 |
| 76 | -1.255812E-06 | -1.255650E-07 | 8.851231E-09 | -2.233710E-10 | 2.062000E-12 |

FIG. 37

| Conditional expression | First embodiment | Second embodiment | Third embodiment | Fourth embodiment |
|---|---|---|---|---|
| EFL | 6.060 | 5.468 | 5.490 | 5.538 |
| Fno | 1.700 | 1.700 | 1.700 | 1.700 |
| HFOV | 38.073 | 45.955 | 45.742 | 45.283 |
| ImgH | 5.800 | 5.800 | 5.800 | 5.800 |
| T1 | 0.775 | 0.703 | 0.655 | 0.809 |
| G12 | 0.440 | 0.358 | 0.357 | 0.358 |
| T2 | 0.329 | 0.320 | 0.298 | 0.300 |
| G23 | 0.145 | 0.128 | 0.129 | 0.120 |
| T3 | 0.776 | 0.697 | 0.626 | 0.515 |
| G34 | 0.300 | 0.260 | 0.251 | 0.322 |
| T4 | 0.700 | 0.657 | 0.690 | 0.584 |
| G45 | 0.337 | 0.261 | 0.320 | 0.183 |
| T5 | 0.479 | 0.471 | 0.513 | 0.371 |
| G56 | 0.157 | 0.065 | 0.132 | 0.039 |
| T6 | 1.117 | 0.893 | 0.923 | 1.319 |
| G67 | 1.522 | 0.840 | 0.840 | 0.960 |
| T7 | 1.364 | 0.610 | 0.592 | 0.508 |
| G7F | 0.500 | 0.500 | 0.500 | 0.500 |
| TF | 0.210 | 0.210 | 0.210 | 0.210 |
| GFP | 0.418 | 0.527 | 0.511 | 0.432 |
| V1 | 55.987 | 55.987 | 55.987 | 55.987 |
| V2 | 19.243 | 19.243 | 19.243 | 19.243 |
| V3 | 55.987 | 55.987 | 55.987 | 55.987 |
| V4 | 55.987 | 55.987 | 55.987 | 55.987 |
| V5 | 19.243 | 19.243 | 19.243 | 19.243 |
| V6 | 55.987 | 55.987 | 55.987 | 55.987 |
| V7 | 21.451 | 21.451 | 21.451 | 37.490 |
| ALT | 5.540 | 4.351 | 4.297 | 4.406 |
| AAG | 2.900 | 1.913 | 2.029 | 1.982 |
| BFL | 1.128 | 1.237 | 1.221 | 1.142 |
| TL | 8.440 | 6.264 | 6.327 | 6.389 |
| TTL | 9.568 | 7.501 | 7.548 | 7.530 |

FIG. 38

| Conditional expression | Fifth embodiment | Sixth embodiment | Seventh embodiment | Eighth embodiment |
|---|---|---|---|---|
| EFL | 5.617 | 5.547 | 5.668 | 6.046 |
| Fno | 1.700 | 1.700 | 1.700 | 1.700 |
| HFOV | 44.857 | 44.398 | 42.634 | 42.021 |
| ImgH | 5.800 | 5.800 | 5.800 | 5.800 |
| T1 | 0.878 | 0.685 | 0.654 | 0.800 |
| G12 | 0.363 | 0.264 | 0.374 | 0.348 |
| T2 | 0.300 | 0.300 | 0.300 | 0.373 |
| G23 | 0.188 | 0.208 | 0.180 | 0.075 |
| T3 | 0.467 | 0.696 | 0.537 | 0.861 |
| G34 | 0.040 | 0.582 | 0.165 | 0.216 |
| T4 | 0.692 | 0.777 | 0.408 | 0.897 |
| G45 | 0.113 | 0.219 | 0.346 | 0.282 |
| T5 | 0.358 | 0.420 | 0.469 | 0.501 |
| G56 | 0.379 | 0.019 | 0.239 | 0.017 |
| T6 | 0.977 | 0.805 | 0.959 | 1.101 |
| G67 | 0.872 | 1.089 | 0.974 | 0.830 |
| T7 | 0.528 | 0.585 | 0.855 | 1.021 |
| G7F | 0.500 | 0.500 | 0.500 | 0.500 |
| TF | 0.210 | 0.210 | 0.210 | 0.210 |
| GFP | 0.438 | 0.378 | 0.418 | 0.479 |
| V1 | 55.987 | 55.987 | 55.987 | 55.987 |
| V2 | 19.243 | 19.243 | 19.243 | 19.243 |
| V3 | 55.987 | 55.987 | 55.987 | 55.987 |
| V4 | 55.987 | 55.987 | 55.987 | 55.987 |
| V5 | 19.243 | 19.243 | 19.243 | 19.243 |
| V6 | 55.987 | 55.987 | 55.987 | 55.987 |
| V7 | 37.490 | 21.451 | 21.451 | 21.451 |
| ALT | 4.199 | 4.267 | 4.182 | 5.554 |
| AAG | 1.955 | 2.381 | 2.278 | 1.769 |
| BFL | 1.148 | 1.088 | 1.128 | 1.189 |
| TL | 6.154 | 6.649 | 6.460 | 7.323 |
| TTL | 7.302 | 7.737 | 7.588 | 8.511 |

FIG. 39

| Conditional expression | First embodiment | Second embodiment | Third embodiment | Fourth embodiment |
|---|---|---|---|---|
| ImgH/D21t61 | 1.800 | 2.028 | 1.960 | 2.384 |
| D21t61/D61t72 | 0.805 | 1.220 | 1.256 | 0.873 |
| V7 | 21.451 | 21.451 | 21.451 | 37.490 |
| V5+V6+V7 | 96.681 | 96.681 | 96.681 | 112.719 |
| (EFL+ALT)/ImgH | 2.000 | 1.693 | 1.687 | 1.715 |
| TTL/(T3+T5+T7) | 3.653 | 4.220 | 4.358 | 5.400 |
| TL*Fno/(T3+G34+G45+T5+G67+T7) | 3.003 | 3.393 | 3.422 | 3.798 |
| D21t42/(G12+G45) | 2.897 | 3.331 | 2.945 | 3.403 |
| D41t62/(G67+T7) | 0.967 | 1.618 | 1.800 | 1.699 |
| (T2+T4+T6+BFL)/(T1+G12) | 2.695 | 2.929 | 3.093 | 2.865 |
| (EFL+TL)/ImgH | 2.500 | 2.023 | 2.037 | 2.056 |
| ALT/(G67+T7) | 1.919 | 3.000 | 3.000 | 3.000 |
| EFL/(T1+G12+G45+T5) | 2.984 | 3.050 | 2.974 | 3.218 |
| TL/(D31t42+G67) | 2.559 | 2.553 | 2.628 | 2.683 |
| (T2+T4+G56+T6)/(T1+T5) | 1.836 | 1.650 | 1.747 | 1.900 |
| (T2+G23+T4+G45+T6)/(T3+G67) | 1.143 | 1.471 | 1.609 | 1.698 |
| (EFL+TTL)/ImgH | 2.695 | 2.236 | 2.248 | 2.253 |
| (AAG+T2+T6)/(T4+G45) | 4.190 | 3.405 | 3.219 | 4.700 |
| (T2+G23+G34+G56+T6)/(T3+T5) | 1.631 | 1.428 | 1.520 | 2.370 |
| (T2+G23+G34+G56+T6)/(T4+T5) | 1.735 | 1.478 | 1.440 | 2.200 |
| Fno*ALT/(G12+G45) | 12.130 | 11.944 | 10.792 | 13.849 |
| Fno*(T1+T2+T6)/(G45+G67+T7) | 1.171 | 1.904 | 1.820 | 2.500 |

FIG. 40

| Conditional expression | Fifth embodiment | Sixth embodiment | Seventh embodiment | Eighth embodiment |
|---|---|---|---|---|
| ImgH/D21t61 | 2.286 | 1.801 | 2.194 | 1.800 |
| D21t61/D61t72 | 1.068 | 1.300 | 0.948 | 1.092 |
| V7 | 37.490 | 21.451 | 21.451 | 21.451 |
| V5+V6+V7 | 112.719 | 96.681 | 96.681 | 96.681 |
| (EFL+ALT)/ImgH | 1.692 | 1.692 | 1.698 | 2.000 |
| TTL/(T3+T5+T7) | 5.400 | 4.550 | 4.078 | 3.571 |
| TL*Fno/(T3+G34+G45+T5+G67+T7) | 4.400 | 3.148 | 3.282 | 3.354 |
| D21t42/(G12+G45) | 3.544 | 5.300 | 2.209 | 3.841 |
| D41t62/(G67+T7) | 1.800 | 1.338 | 1.323 | 1.511 |
| (T2+T4+T6+BFL)/(T1+G12) | 2.512 | 3.127 | 2.718 | 3.099 |
| (EFL+TL)/ImgH | 2.030 | 2.103 | 2.091 | 2.305 |
| ALT/(G67+T7) | 3.000 | 2.550 | 2.286 | 3.000 |
| EFL/(T1+G12+G45+T5) | 3.282 | 3.492 | 3.076 | 3.130 |
| TL/(D31t42+G67) | 2.972 | 2.115 | 3.100 | 2.612 |
| (T2+T4+G56+T6)/(T1+T5) | 1.900 | 1.720 | 1.697 | 1.835 |
| (T2+G23+T4+G45+T6)/(T3+G67) | 1.695 | 1.294 | 1.451 | 1.613 |
| (EFL+TTL)/ImgH | 2.227 | 2.290 | 2.286 | 2.510 |
| (AAG+T2+T6)/(T4+G45) | 4.015 | 3.499 | 4.695 | 2.750 |
| (T2+G23+G34+G56+T6)/(T3+T5) | 2.285 | 1.715 | 1.833 | 1.308 |
| (T2+G23+G34+G56+T6)/(T4+T5) | 1.796 | 1.600 | 2.103 | 1.275 |
| Fno*ALT/(G12+G45) | 15.000 | 15.000 | 9.879 | 14.975 |
| Fno*(T1+T2+T6)/(G45+G67+T7) | 2.421 | 1.608 | 1.496 | 1.812 |

FIG. 41

OPTICAL IMAGING LENS

CROSS-REFERENCE TO RELATED APPLICATION

This application claims the priority benefit of China application serial no. 202011353667.1, filed on Nov. 26, 2020. The entirety of the above-mentioned patent application is hereby incorporated by reference herein and made a part of this specification.

BACKGROUND OF THE INVENTION

1. Field of the Invention

The invention relates to an optical element, and in particular to an optical imaging lens.

2. Description of Related Art

The specifications of a portable electronic device are changing quickly, and a key component thereof, an optical imaging lens, has also developed to be more diversified. The main lens of a portable electronic device not only requires a larger aperture and maintains a shorter system length, but also requires higher pixels and higher resolution. Having high pixels implies that the image height of the lens must be increased, and a larger image sensor is adopted to receive imaging rays to increase the pixel requirement. However, due to the design of a large aperture, the lens receives more imaging rays, which increases the difficulty of design. Having high pixels also requires the resolution of the lens to be improved. By the large aperture design, the design difficulty is multiplied. Therefore, how to add multiple lens elements into a limited system length of the lens and improve the resolution while increasing the aperture and the image height is an issue that needs to be challenged and solved.

SUMMARY OF THE INVENTION

The invention provides an optical imaging lens which can provide a lens with a short system length, a large aperture (small F-number (Fno)) and a greater image height, and has good imaging quality. This optical imaging lens can be used for photographing images and recording scene videos, and can be applied to a portable electronic product, such as: a mobile phone, a camera, a flat computer and a personal digital assistant (PDA).

One embodiment of the invention provides an optical imaging lens, including a first lens element, a second lens element, a third lens element, a fourth lens element, a fifth lens element, a sixth lens element and a seventh lens element sequentially arranged along an optical axis from an object side to an image side, and each of the first lens element to the seventh lens element includes an object-side surface facing the object side and allowing imaging rays to pass through and an image-side surface facing the image side and allowing the imaging rays to pass through. An optical axis region of the object-side surface of the first lens element is convex. A periphery region of the image-side surface of the second lens element is concave. The fourth lens element has positive refracting power, and an optical axis region of the object-side surface of the fourth lens element is concave. An optical axis region of the image-side surface of the fifth lens element is convex. Lens elements of the optical imaging lens are only the seven lens elements described above, and the optical imaging lens satisfies the following conditional expressions: $D21t61/D61t72 \leq 1.300$; and $V7 \leq 40.000$. $D21t61$ is a distance from the object-side surface of the second lens element to the object-side surface of the sixth lens element on the optical axis; $D61t72$ is a distance from the object-side surface of the sixth lens element to the image-side surface of the seventh lens element on the optical axis, and $V7$ is an Abbe number of the seventh lens element.

One embodiment of the invention provides an optical imaging lens, including a first lens element, a second lens element, a third lens element, a fourth lens element, a fifth lens element, a sixth lens element and a seventh lens element sequentially arranged along an optical axis from an object side to an image side, and each of the first lens element to the seventh lens element includes an object-side surface facing the object side and allowing imaging rays to pass through and an image-side surface facing the image side and allowing the imaging rays to pass through. An optical axis region of the object-side surface of the first lens element is convex. The fourth lens element has positive refracting power, and an optical axis region of the object-side surface of the fourth lens element is concave. An optical axis region of the image-side surface of the fifth lens element is convex. An optical axis region of the object-side surface of the seventh lens element is convex. Lens elements of the optical imaging lens are only the seven lens elements described above, and the optical imaging lens satisfies the following conditional expressions: $D21t61/D61t72 \leq 1.300$; and $V7 \leq 40.000$. $D21t61$ is a distance from the object-side surface of the second lens element to the object-side surface of the sixth lens element on the optical axis; $D61t72$ is a distance from the object-side surface of the sixth lens element to the image-side surface of the seventh lens element on the optical axis, and $V7$ is an Abbe number of the seventh lens element.

One embodiment of the invention provides an optical imaging lens, including a first lens element, a second lens element, a third lens element, a fourth lens element, a fifth lens element, a sixth lens element and a seventh lens element sequentially arranged along an optical axis from an object side to an image side, and each of the first lens element to the seventh lens element includes an object-side surface facing the object side and allowing imaging rays to pass through and an image-side surface facing the image side and allowing the imaging rays to pass through. The first lens element has positive refracting power, and a periphery region of the image-side surface of the first lens element is concave. A periphery region of the object-side surface of the second lens element is concave, and a periphery region of the image-side surface of the second lens element is concave. An optical axis region of the image-side surface of the fourth lens element is convex. An optical axis region of the object-side surface of the seventh lens element is convex. Lens elements of the optical imaging lens are only the seven lens elements described above, and the optical imaging lens satisfies the following conditional expressions: $D21t61/D61t72 \leq 1.300$; and $V5+V6+V7 \leq 115.000$. $D21t61$ is a distance from the object-side surface of the second lens element to the object-side surface of the sixth lens element on the optical axis; $D61t72$ is a distance from the object-side surface of the sixth lens element to the image-side surface of the seventh lens element on the optical axis; $V5$ is an Abbe number of the fifth lens element; $V6$ is an Abbe number of the sixth lens element, and $V7$ is an Abbe number of the seventh lens element.

Based on the above, the optical imaging lens of the embodiments of the invention has the beneficial effects that:

the optical imaging lens of the embodiments of the invention satisfies the quantity of the above lens elements and the surface shapes of the above lens elements, and satisfies the above conditional expressions, so that the optical imaging lens of the embodiments of the invention can provide a lens with a short system length and a large aperture, and has a greater image height and good imaging quality.

To enable the above features and advantages of the invention to be more comprehensible, the invention is described in detail below through embodiments with reference to the accompanying drawings.

BRIEF DESCRIPTION OF THE DRAWINGS

FIG. 8 illustrates detailed optical data of an optical imaging lens of a first embodiment of the invention.

FIG. 9 illustrates aspheric parameters of an optical imaging lens of a first embodiment of the invention.

FIG. 12 illustrates detailed optical data of an optical imaging lens of a second embodiment of the invention.

FIG. 13 illustrates aspheric parameters of an optical imaging lens of a second embodiment of the invention.

FIG. 16 illustrates detailed optical data of an optical imaging lens of a third embodiment of the invention.

FIG. 17 illustrates aspheric parameters of an optical imaging lens of a third embodiment of the invention.

FIG. 20 illustrates detailed optical data of an optical imaging lens of a fourth embodiment of the invention.

FIG. 21 illustrates aspheric parameters of an optical imaging lens of a fourth embodiment of the invention.

FIG. 24 illustrates detailed optical data of an optical imaging lens of a fifth embodiment of the invention.

FIG. 25 illustrates aspheric parameters of an optical imaging lens of a fifth embodiment of the invention.

FIG. 28 illustrates detailed optical data of an optical imaging lens of a sixth embodiment of the invention.

FIG. 29 illustrates aspheric parameters of an optical imaging lens of a sixth embodiment of the invention.

FIG. 30 is a schematic diagram of an optical imaging lens of a seventh embodiment of the invention.

FIG. 31A to FIG. 31D are diagrams of longitudinal spherical aberrations and various aberrations of an optical imaging lens of a seventh embodiment.

FIG. 32 illustrates detailed optical data of an optical imaging lens of a seventh embodiment of the invention.

FIG. 33 illustrates aspheric parameters of an optical imaging lens of a seventh embodiment of the invention.

FIG. 36 illustrates detailed optical data of an optical imaging lens of an eighth embodiment of the invention.

FIG. 37 illustrates aspheric parameters of an optical imaging lens of an eighth embodiment of the invention.

FIG. 38 to FIG. 41 illustrate all important parameters and numerical values of relational expressions of the optical imaging lenses of first to eighth embodiments of the invention.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
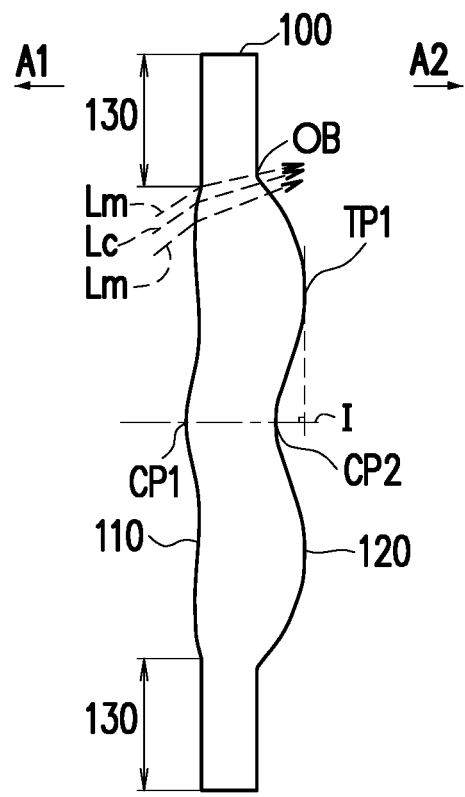
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
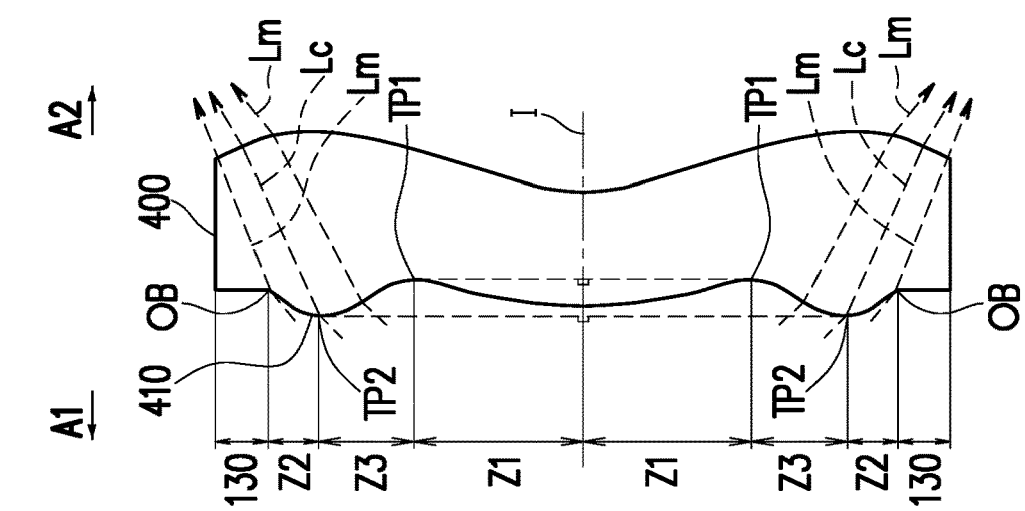
FIG. 4 is a schematic diagram illustrating a surface shape structure of a lens element of Example II.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
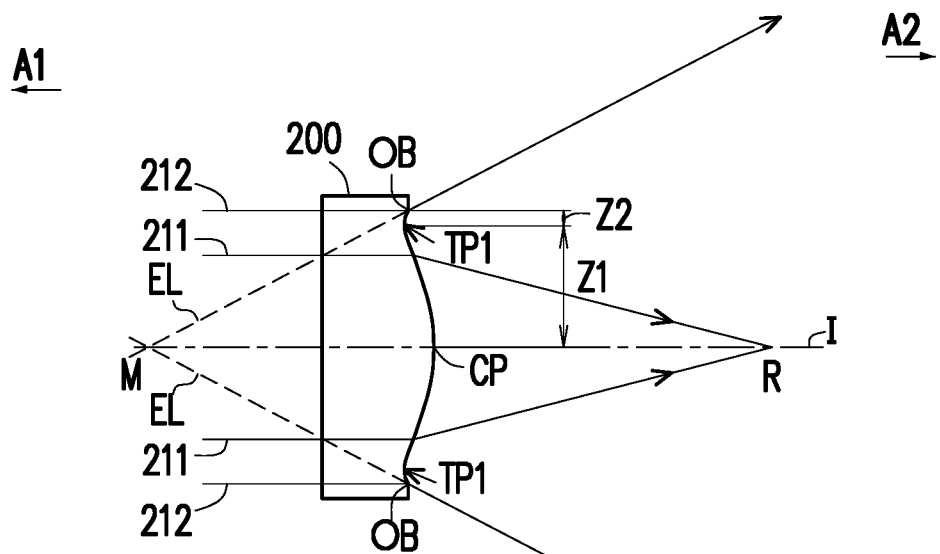
FIG. 2 is a schematic diagram illustrating a concave-convex structure and a focal point of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
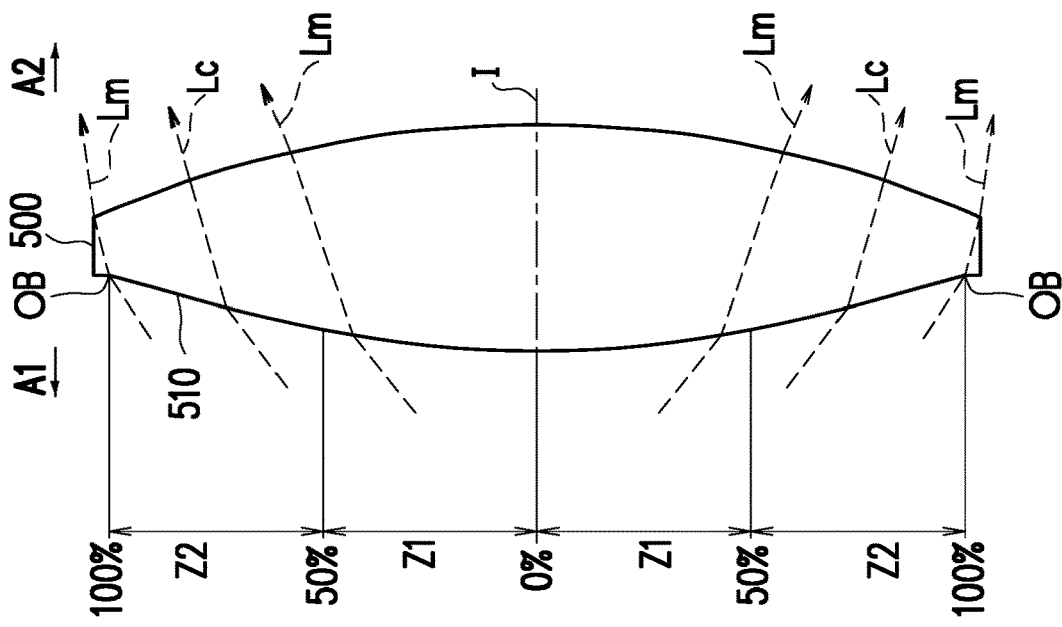
FIG. 5 is a schematic diagram illustrating a surface shape structure of a lens element of Example III.
Figure 3:
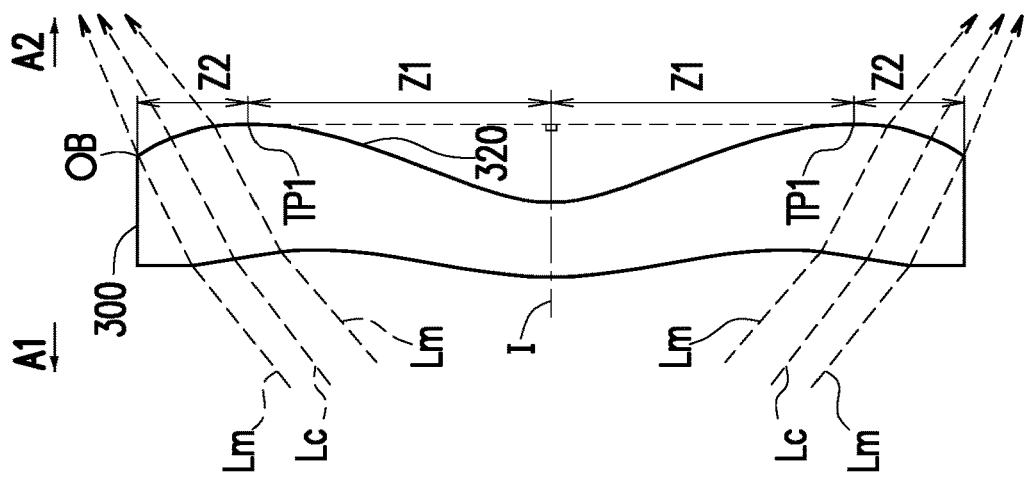
FIG. 3 is a schematic diagram illustrating a surface shape structure of a lens element of Example I.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
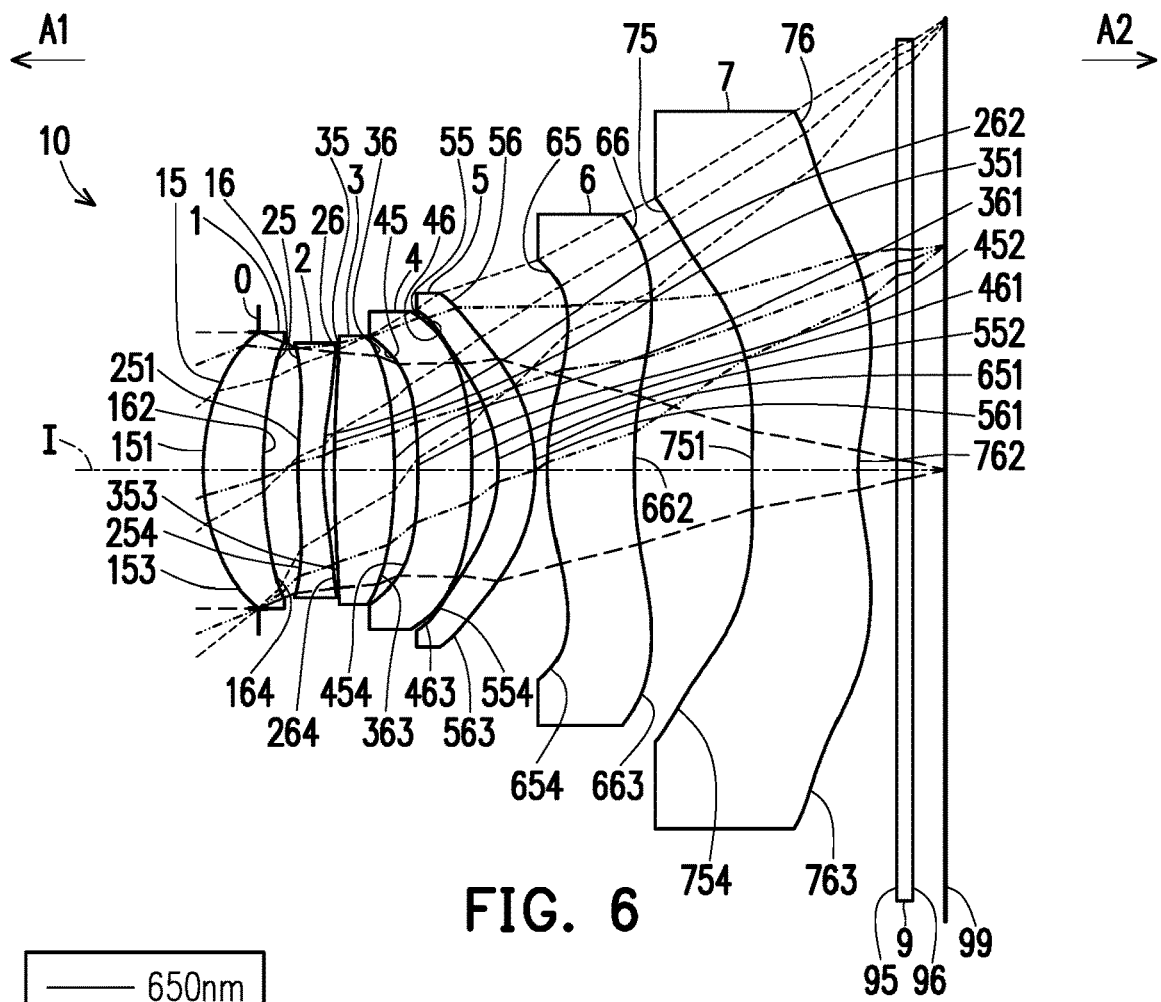
FIG. 6 is a schematic diagram of an optical imaging lens of a first embodiment of the invention.

FIG. 6 is a schematic diagram of an optical imaging lens of a first embodiment of the invention. FIG. 7A to FIG. 7D are diagrams of longitudinal spherical aberrations and various aberrations of the optical imaging lens of the first embodiment. Referring to FIG. 6 at first, an optical imaging lens 10 of the first embodiment of the invention includes an aperture 0, a first lens element 1, a second lens element 2, a third lens element 3, a fourth lens element 4, a fifth lens element 5, a sixth lens element 6, a seventh lens element 7 and a filter 9 sequentially arranged along an optical axis I of the optical imaging lens 10 from an object side A1 to an image side A2. When rays emitted by an object to be photographed enter the optical imaging lens 10, and may form an image on an image plane 99 after sequentially passing through the aperture 0, the first lens element 1, the second lens element 2, the third lens element 3, the fourth lens element 4, the fifth lens element 5, the sixth lens element 6, the seventh lens element 7 and the filter 9. The filter 9 is arranged between the seventh lens element 7 and the image plane 99. The filter 9 may allow rays having appropriate wavelengths (such as infrared rays or visible light) to pass through and block rays having other wavelengths, but the invention is not limited thereto. It is supplemented that the object side A1 is a side facing the object to be photographed, and the image side A2 is a side facing the image plane 99.

In the present embodiment, the first lens element 1, the second lens element 2, the third lens element 3, the fourth lens element 4, the fifth lens element 5, the sixth lens element 6, the seventh lens element 7 and the filter 9 of the optical imaging lens 10 each has an object-side surface 15, 25, 35, 45, 55, 65, 75, 95 facing the object side A1 and allowing imaging rays to pass through, and an image-side surface 16, 26, 36, 46, 56, 66, 76, 96 facing the image side A2 and allowing the imaging rays to pass through. In the present embodiment, the aperture 0 is arranged on the object side A1 of the first lens element 1.

The first lens element 1 has positive refracting power. A material of the first lens element 1 is plastic, but the invention is not limited thereto. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In the present embodiment, both the object-side surface 15 and the image-side surface 16 of the first lens element 1 are aspheric surfaces.

The second lens element 2 has negative refracting power. A material of the second lens element 2 is plastic, but the invention is not limited thereto. An optical axis region 251 of the object-side surface 25 of the second lens element 2 is convex, and a periphery region 254 thereof is concave. An optical axis region 262 of the image-side surface 26 of the second lens element 2 is concave, and a periphery region 264 thereof is concave. In the present embodiment, both the object-side surface 25 and the image-side surface 26 of the second lens element 2 are aspheric surfaces.

The third lens element 3 has positive refracting power. A material of the third lens element 3 is plastic, but the invention is not limited thereto. An optical axis region 351 of the object-side surface 35 of the third lens element 3 is convex, and a periphery region 353 thereof is convex. An optical axis region 361 of the image-side surface 36 of the third lens element 3 is convex, and a periphery region 363 thereof is convex. In the present embodiment, both the object-side surface 35 and the image-side surface 36 of the third lens element 3 are aspheric surfaces.

The fourth lens element 4 has positive refracting power. A material of the fourth lens element 4 is plastic, but the invention is not limited thereto. An optical axis region 452 of the object-side surface 45 of the fourth lens element 4 is concave, and a periphery region 454 thereof is concave. An optical axis region 461 of the image-side surface 46 of the fourth lens element 4 is convex, and a periphery region 463 thereof is convex. In the present embodiment, both the object-side surface 45 and the image-side surface 46 of the fourth lens element 4 are aspheric surfaces.

The fifth lens element 5 has negative refracting power. A material of the fifth lens element 5 is plastic, but the invention is not limited thereto. An optical axis region 552 of the object-side surface 55 of the fourth lens element 5 is concave, and a periphery region 554 thereof is concave. An optical axis region 561 of the image-side surface 56 of the fifth lens element 5 is convex, and a periphery region 563 thereof is convex. In the present embodiment, both the object-side surface 55 and the image-side surface 56 of the fifth lens element 5 are aspheric surfaces.

The sixth lens element 6 has positive refracting power. A material of the sixth lens element 6 is plastic, but the invention is not limited thereto. An optical axis region 651 of the object-side surface 65 of the sixth lens element 6 is convex, and a periphery region 654 thereof is concave. An optical axis region 662 of the image-side surface 66 of the sixth lens element 6 is concave, and a periphery region 663 thereof is convex. In the present embodiment, both the object-side surface 65 and the image-side surface 66 of the sixth lens element 6 are aspheric surfaces.

The seventh lens element 7 has negative refracting power. A material of the seventh lens element 7 is plastic, but the invention is not limited thereto. An optical axis region 751 of the object-side surface 75 of the seventh lens element 7 is convex, and a periphery region 754 thereof is concave. An optical axis region 762 of the image-side surface 76 of the seventh lens element 7 is concave, and a periphery region 763 thereof is convex. In the present embodiment, both the object-side surface 75 and the image-side surface 76 of the seventh lens element 7 are aspheric surfaces.

In the present embodiment, the optical imaging lens 10 only includes seven lens elements in total: the first lens element 1, the second lens element 2, the third lens element 3, the fourth lens element 4, the fifth lens element 5, the sixth lens element 6 and the seventh lens element 7.

Other detailed optical data of the first embodiment is as shown in FIG. 8, and the optical imaging lens 10 of the first embodiment has an effective focal length (EFL) of 6.060 millimeters (mm), a half field of view (HFOV) of 38.073°, a system length (TTL) of 9.568 mm, an F-number (Fno) of 1.700, and an image height (ImgH) of 5.800 mm. The system length is a distance from the object-side surface 15 of the first lens element 1 to the image plane 99 on the optical axis I.

In addition, in the present embodiment, the object-side surfaces 15, 25, 35, 45, 55, 65, 75 and the image-side surfaces 16, 26, 36, 46, 56, 66, 76 of the first lens element 1, the second lens element 2, the third lens element 3, the fourth lens element 4, the fifth lens element 5, the sixth lens element 6 and the seventh lens element 7 are all aspheric surfaces, and these aspheric surfaces are defined according to the following formula:

$$Z(Y) = \frac{Y^2}{R}\left/\left(1 + \sqrt{1-(1+K)\frac{Y^2}{R^2}}\right)\right. + \sum_{i=1}^{n} a_{2i} \times Y^{2i} \quad (1)$$

where
Y: a distance between a point on an aspheric curve and the optical axis I;
Z: a depth of an aspheric surface (a perpendicular distance between a point, which is Y away from the optical axis I, on the aspheric surface and a tangent plane tangent to a vertex on the aspheric optical axis I);
R: a radius of curvature of a surface of the lens element close to the optical axis I;
K: conic constant;
$a_{2i}$: a 2ith-order aspheric coefficient.

Various aspheric coefficients of the object-side surface 15 of the first lens element 1 to the image-side surface 76 of the seventh lens element 7 in Formula (1) are as shown in FIG. 9. Column number 15 in FIG. 9 denotes an aspheric coefficient of the object-side surface 15 of the first lens element 1, and the rest columns may be deduced by analogy. The aspheric coefficients $a_2$ of the object-side surface 15 of the first lens element 1 to the image-side surface 76 of the seventh lens element 7 in Formula (1) are all 0. To make the chart concise, the coefficient az is omitted in FIG. 9.

In addition, the relations among all the important parameters of the optical imaging lens 10 of the first embodiment are as shown in FIG. 38 to FIG. 41. In FIG. 38 and FIG. 39, all the parameters in the EFL column, from the ImgH column to the GFP column, and from the ALT column to the TTL column are in mm.

T1 is a thickness of the first lens element 1 on the optical axis I;

T2 is a thickness of the second lens element 2 on the optical axis I;

T3 is a thickness of the third lens element 3 on the optical axis I;

T4 is a thickness of the fourth lens element 4 on the optical axis I;

T5 is a thickness of the fifth lens element 5 on the optical axis I;

T6 is a thickness of the sixth lens element 6 on the optical axis I;

T7 is a thickness of the seventh lens element 7 on the optical axis I;

G12 is an air gap between the first lens element 1 and the second lens element 2 on the optical axis I, i.e., a distance from the image-side surface 16 of the first lens element 1 to the object-side surface 25 of the second lens element 2 on the optical axis I;

G23 is an air gap between the second lens element 2 and the third lens element 3 on the optical axis I, i.e., a distance from the image-side surface 26 of the second lens element 2 to the object-side surface 35 of the third lens element 3 on the optical axis I;

G34 is an air gap between the third lens element 3 and the fourth lens element 4 on the optical axis I, i.e., a distance from the image-side surface 36 of the third lens element 3 to the object-side surface 45 of the fourth lens element 4 on the optical axis I;

G45 is an air gap between the fourth lens element 4 and the fifth lens element 5 on the optical axis I, i.e., a distance from the image-side surface 46 of the fourth lens element 4 to the object-side surface 55 of the fifth lens element 5 on the optical axis I;

G56 is an air gap between the fifth lens element 5 and the sixth lens element 6 on the optical axis I, i.e., a distance from the image-side surface 56 of the fifth lens element 5 to the object-side surface 65 of the sixth lens element 6 on the optical axis I;

G67 is an air gap between the sixth lens element 6 and the seventh lens element 7 on the optical axis I, i.e., a distance from the image-side surface 66 of the sixth lens element 6 to the object-side surface 75 of the fifth lens element 7 on the optical axis I;

AAG is a sum of six air gaps from the first lens element 1 to the seventh lens element 7 on the optical axis I, i.e., a sum of G12, G23, G34, G45, G56 and G67;

ALT is a sum of the thicknesses of the seven lens elements from the first lens element 1 to the seventh lens element 7 on the optical axis I, i.e., a sum of T1, T2, T3, T4, T5, T6 and T7;

TL is a distance from the object-side surface 15 of the first lens element 1 to the image-side surface 76 of the seventh lens element 7 on the optical axis I;

TTL is a distance from the object-side surface 15 of the first lens element 1 to the image plane 99 on the optical axis I;

BFL is a distance from the image-side surface 76 of the seventh lens element 7 to the image plane 99 on the optical axis I;

EFL is an effective focal length (EFL) of the optical imaging lens 10;
Fno is an F-number of the optical imaging lens 10;
HFOV is a half field of view of the optical imaging lens 10;
ImgH is an image height of the optical imaging lens 10;
G7F is a distance from the seventh lens element 7 to the filter 9 on the optical axis I;
TF is a thickness of the filter 9 on the optical axis I;
GFP is a distance from the filter 9 to the image plane 99 on the optical axis I;
V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6; and
V7 is an Abbe number of the seventh lens element 7.
In addition, the followings are further defined:
D21t61 is a distance from the object-side surface 25 of the second lens element 2 to the object-side surface 65 of the sixth lens element 6 on the optical axis I;
D61t72 is a distance from the object-side surface 65 of the sixth lens element 6 to the image-side surface 76 of the seventh lens element 7 on the optical axis I;
D21t42 is a distance from the object-side surface 25 of the second lens element 2 to the image-side surface 46 of the fourth lens element 4 on the optical axis I;
D41t62 is a distance from the object-side surface 45 of the fourth lens element 4 to the image-side surface 66 of the sixth lens element 6 on the optical axis I;
D31t42 is a distance from the object-side surface 35 of the third lens element 3 to the image-side surface 46 of the fourth lens element 4 on the optical axis I;
f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6; and
n7 is a refractive index of the seventh lens element 7.

Figures 7A, 7B, 7C, 7D:
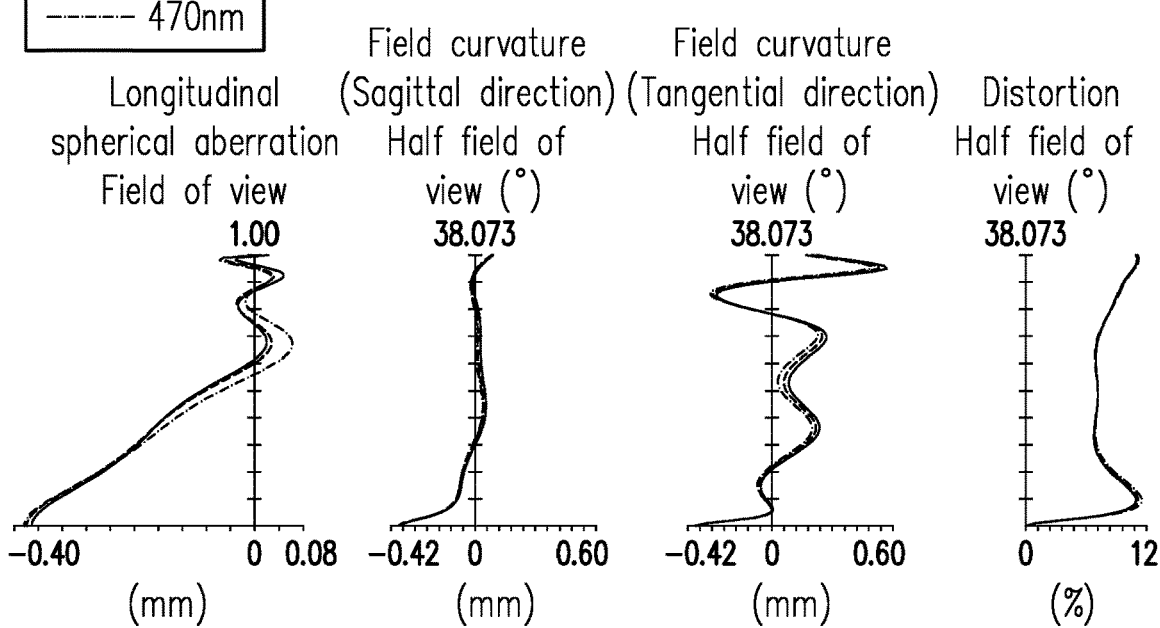
FIG. 7A to FIG. 7D are diagrams of longitudinal spherical aberrations and various aberrations of an optical imaging lens of a first embodiment.

Referring to FIG. 7A to FIG. 7D cooperatively, the diagram of FIG. 7A illustrates a longitudinal spherical aberration of the first embodiment; the diagrams of FIG. 7B and FIG. 7C respectively illustrate a field curvature aberration in a sagittal direction and a field curvature aberration in a tangential direction on the image plane 99 of the first embodiment at wavelengths of 470 nanometers (nm), 555 nm and 650 nm; and the diagram of FIG. 7D illustrates a distortion aberration on the image plane 99 of the first embodiment at wavelengths of 470 nm, 555 nm and 650 nm. In FIG. 7A which shows the longitudinal spherical aberration of the present first embodiment, a curve generated by each wavelength is very close, and is close to the center, which indicates that off-axis rays at different heights of each wavelength are concentrated near to an imaging point. It can be seen from the deflection amplitude of the curve of each wavelength that deflections of the imaging points of the off-axis rays at different heights are controlled within a range of ±0.4 mm, so that the present first embodiment obviously improves the spherical aberration of the same wavelength in deed. In addition, distances between three representative wavelengths are quite close, it indicates that imaging positions of different wavelength rays are quite concentrated, so that the chromatic aberration is also obviously improved.

In the two field curvature aberration diagrams of FIG. 7B and FIG. 7C, the field curvature aberrations of three representative wavelengths within an entire field of view range fall within ±0.60 mm, it indicates that an optical system of the present first embodiment can effectively eliminate the aberration. The distortion aberration diagram of FIG. 7D shows that the distortion aberration of the present first embodiment is maintained within a range of ±12%, it indicates that the distortion aberration of the present first embodiment has met an imaging quality requirement of the optical system. It is indicated accordingly that compared with an existing optical imaging lens, the optical imaging lens of the present first embodiment can still provide good imaging quality in the circumstances that the system length has been reduced to about 9.568 mm, the Fno is about 1.700 and the image height is about 5.800 mm.

Figure 10:
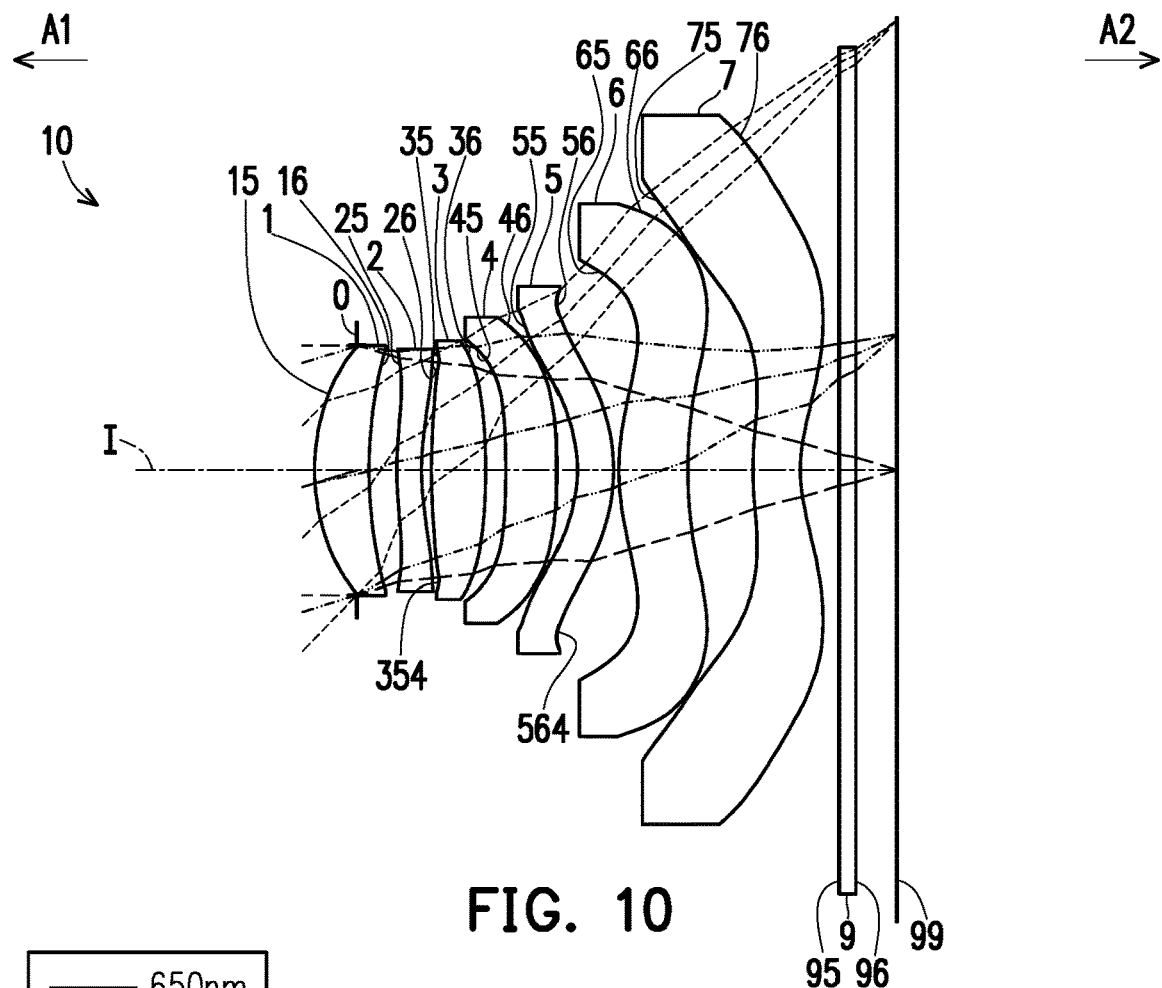
FIG. 10 is a schematic diagram of an optical imaging lens of a second embodiment of the invention.

FIG. 10 is a schematic diagram of an optical imaging lens of a second embodiment of the invention. FIG. 11A to FIG. 11D are diagrams of longitudinal spherical aberrations and various aberrations of the optical imaging lens of the second embodiment. Referring to FIG. 10 at first, the second embodiment of the optical imaging lens 10 of the invention is approximately similar to the first embodiment, except that: various optical data, aspheric coefficients, and parameters among the lens elements 1, 2, 3, 4, 5, 6 and 7 are different more or less. In addition, in the present embodiment, the periphery region 354 of the object-side surface 35 of the third lens element 3 is concave, and the periphery region 564 of the image-side surface 56 of the fifth lens element 5 is concave. It should be noted that in order to show the drawing clearly, numerals of the optical axis regions and the periphery regions which are similar to those in the first embodiment are omitted in FIG. 10.

Detailed optical data of the optical imaging lens 10 of the second embodiment are as shown in FIG. 12, and the optical imaging lens 10 of the second embodiment has an EFL of 5.468 mm, an HFOV of 45.955°, a system length (TTL) of 7.501 mm, an Fno of 1.700, and an image height (ImgH) of 5.800 mm.

As shown in FIG. 13, various aspheric coefficients of the object-side surface 15 of the first lens element 1 to the image-side surface 76 of the seventh lens 7 of the second embodiment in the formula (1) are illustrated. The aspheric coefficients $a_z$ of the object-side surface 15 of the first lens element 1 to the image-side surface 76 of the seventh lens element 7 in Formula (1) are all 0. To make the chart concise, the coefficient $a_2$ is omitted in FIG. 13.

In addition, relations among all important parameters in the optical imaging lens 10 of the second embodiment are as shown in FIG. 38 to FIG. 41.

Figures 11A, 11B, 11C, 11D:
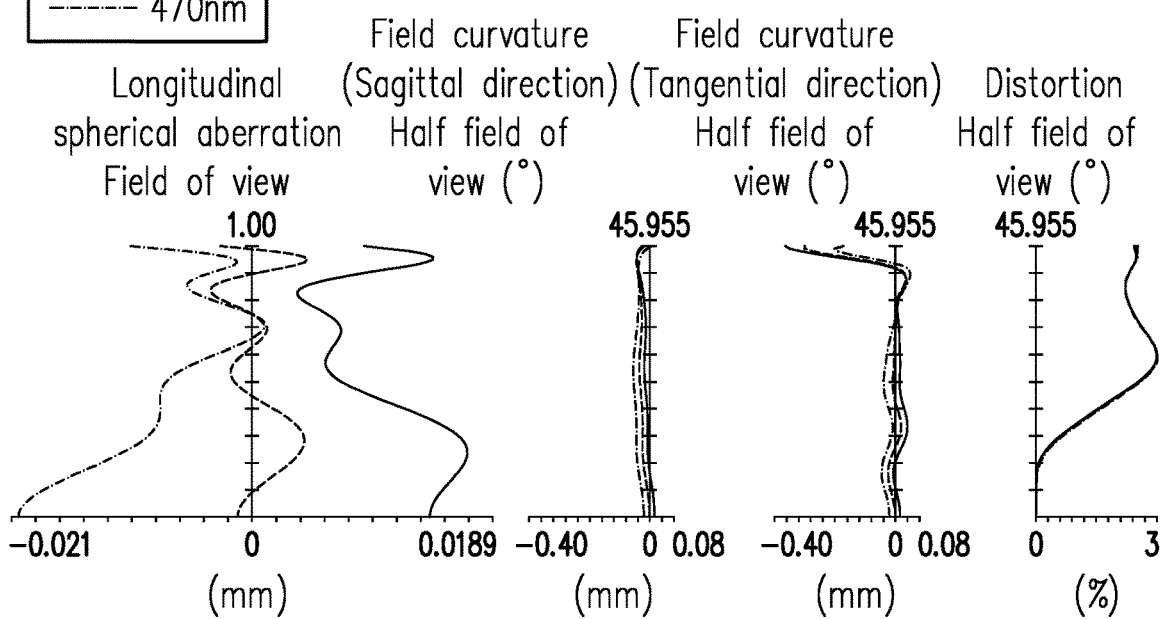
FIG. 11A to FIG. 11D are diagrams of longitudinal spherical aberrations and various aberrations of an optical imaging lens of a second embodiment.

In FIG. 11A, which illustrates a longitudinal spherical aberration of the present second embodiment, deflections of imaging points of off-axis rays at different heights are controlled within a range of ±0.021 mm. In the two field curvature aberration diagrams of FIG. 11B and FIG. 11C, the field curvature aberrations of three representative wavelengths within an entire field of view range fall within ±0.40 mm. The distortion aberration diagram of FIG. 11D shows that the distortion aberration of the present second embodiment is maintained within a range of ±3.3%. It is indicated accordingly that compared with the existing optical imaging lens, the present second embodiment can still provide good imaging quality in the circumstances that the system length has been reduced to about 5.468 mm, the Fno is about 1.700 and the image height is about 5.800 mm.

It can be known from the aforementioned instructions that compared with the first embodiment, the second embodiment has the advantages that: the system length (TTL) of the second embodiment is shorter than that of the first embodiment, the HFOV of the second embodiment is greater than that of the first embodiment, and the longitudinal spherical aberration, the field curvature aberration and the distortion aberration of the second embodiment are better than those of the first embodiment.

Figure 14:
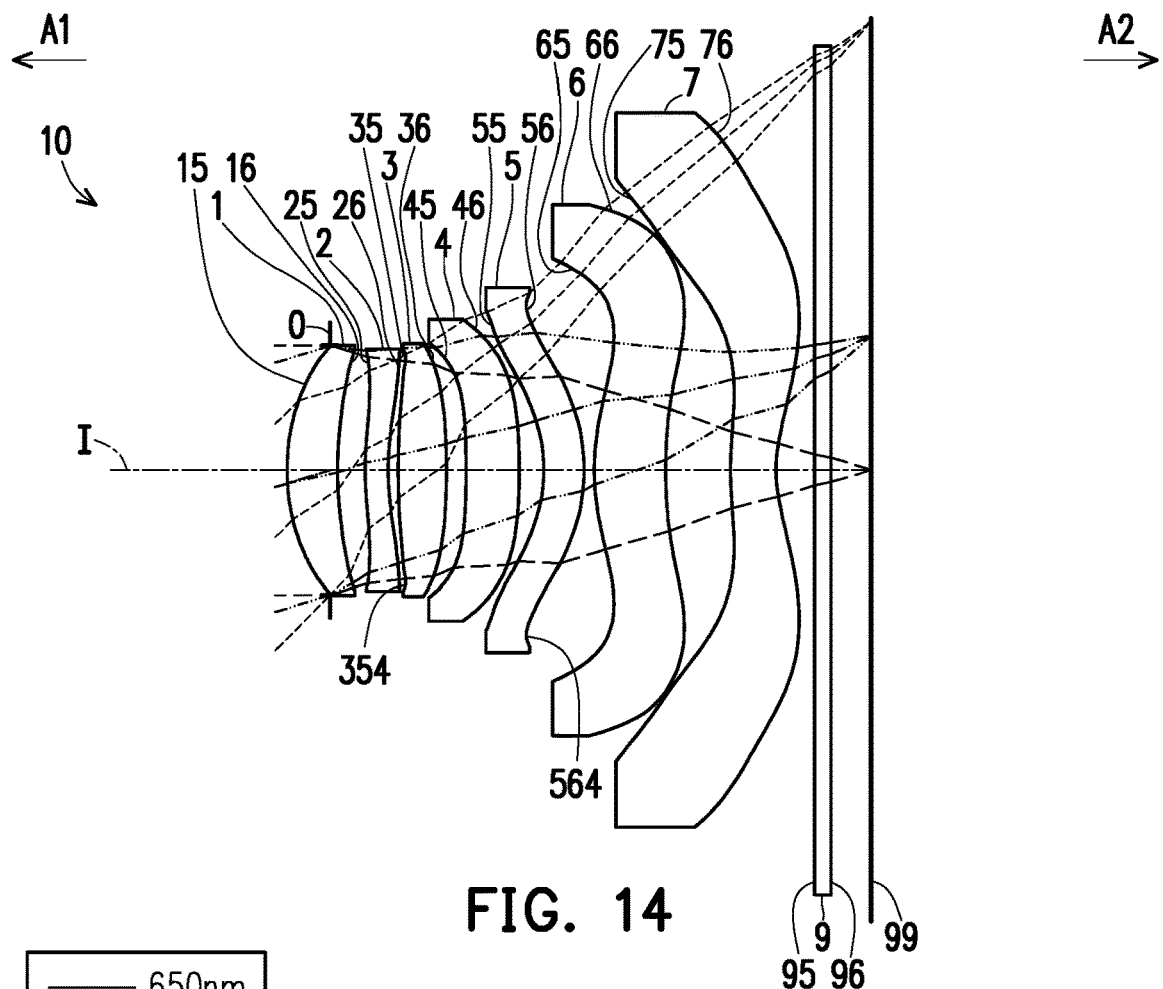
FIG. 14 is a schematic diagram of an optical imaging lens of a third embodiment of the invention.

FIG. 14 is a schematic diagram of an optical imaging lens of a third embodiment of the invention. FIG. 15A to FIG. 15D are diagrams of longitudinal spherical aberrations and various aberrations of the optical imaging lens of the third embodiment. Referring to FIG. 14 at first, the third embodiment of the optical imaging lens 10 of the invention is approximately similar to the first embodiment, except that: various optical data, aspheric coefficients, and parameters among the lens elements 1, 2, 3, 4, 5, 6 and 7 are different more or less. In addition, in the present embodiment, the periphery region 354 of the object-side surface 35 of the third lens element 3 is concave, and the periphery region 564 of the image-side surface 56 of the fifth lens element 5 is concave. It should be noted that in order to show the drawing clearly, numerals of the optical axis regions and the periphery regions which are similar to those in the first embodiment are omitted in FIG. 14.

Detailed optical data of the optical imaging lens 10 of the third embodiment are as shown in FIG. 16, and the optical imaging lens 10 of the third embodiment has an EFL of 5.490 mm, an HFOV of 45.742°, a system length (TTL) of 7.548 mm, an Fno of 1.700, and an image height (ImgH) of 5.800 mm.

As shown in FIG. 17, various aspheric coefficients of the object-side surface 15 of the first lens element 1 to the image-side surface 76 of the seventh lens 7 of the third embodiment in the formula (1) are illustrated. The aspheric coefficients $a_2$ of the object-side surface 15 of the first lens element 1 to the image-side surface 76 of the seventh lens element 7 in Formula (1) are all 0. To make the chart concise, the coefficient $a_2$ is omitted in FIG. 17.

In addition, relations among all important parameters in the optical imaging lens 10 of the third embodiment are as shown in FIG. 38 to FIG. 41.

Figures 15A, 15B, 15C, 15D:
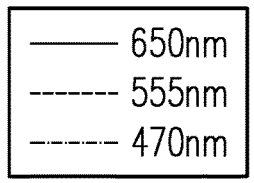
FIG. 15A to FIG. 15D are diagrams of longitudinal spherical aberrations and various aberrations of an optical imaging lens of a third embodiment.

In FIG. 15A, which illustrates a longitudinal spherical aberration of the present third embodiment, deflections of imaging points of off-axis rays at different heights are controlled within a range of ±0.0225 mm. In the two field curvature aberration diagrams of FIG. 15B and FIG. 15C, the field curvature aberrations of three representative wavelengths within an entire field of view range fall within ±0.25 mm. The distortion aberration diagram of FIG. 15D shows that the distortion aberration of the present third embodiment is maintained within a range of ±3.5%. It is indicated accordingly that compared with the existing optical imaging lens, the present third embodiment can still provide good imaging quality in the circumstances that the system length has been reduced to about 7.548 mm, the Fno is about 1.700 and the image height is about 5.800 mm.

It can be known from the aforementioned instructions that compared with the first embodiment, the third embodiment has the advantages that: the system length (TTL) of the third embodiment is shorter than that of the first embodiment, the HFOV of the third embodiment is greater than that of the first embodiment, and the longitudinal spherical aberration, the field curvature aberration and the distortion aberration of the third embodiment are better than those of the first embodiment.

Figure 18:
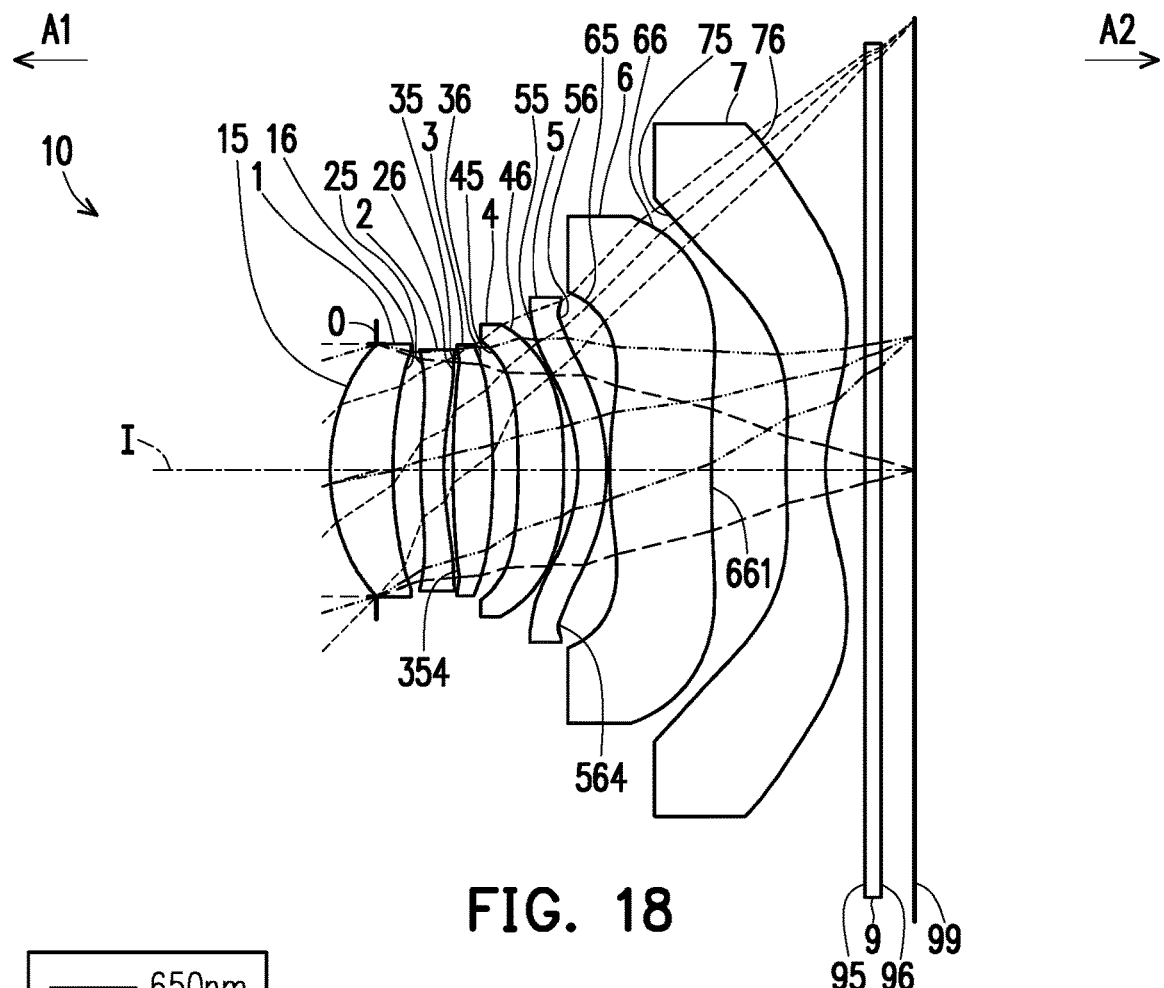
FIG. 18 is a schematic diagram of an optical imaging lens of a fourth embodiment of the invention.

FIG. 18 is a schematic diagram of an optical imaging lens of a fourth embodiment of the invention. FIG. 19A to FIG. 19D are diagrams of longitudinal spherical aberrations and various aberrations of the optical imaging lens of the fourth embodiment. Referring to FIG. 18 at first, the fourth embodiment of the optical imaging lens 10 of the invention is approximately similar to the first embodiment, except that: various optical data, aspheric coefficients, and parameters among the lens elements 1, 2, 3, 4, 5, 6 and 7 are different more or less. In addition, in the present embodiment, the periphery region 354 of the object-side surface 35 of the third lens element 3 is concave; the periphery region 564 of the image-side surface 56 of the fifth lens element 5 is concave; the optical axis region 661 of the image-side surface 66 of the sixth lens element 6 is convex, and the Abbe number of the seventh lens element 7 is different (the Abbe number V7 of the seventh lens element 7 in the fourth embodiment is 37.490, and the Abbe number V7 of the seventh lens element 7 in the first embodiment is 21.451). It should be noted that in order to show the drawing clearly, numerals of the optical axis regions and the periphery regions which are similar to those in the first embodiment are omitted in FIG. 18.

Detailed optical data of the optical imaging lens 10 of the fourth embodiment are as shown in FIG. 20, and the optical imaging lens 10 of the fourth embodiment has an EFL of 5.538 mm, an HFOV of 45.283°, a system length (TTL) of 7.530 mm, an Fno of 1.700, and an image height (ImgH) of 5.800 mm.

As shown in FIG. 21, various aspheric coefficients of the object-side surface 15 of the first lens element 1 to the image-side surface 76 of the seventh lens 7 of the fourth embodiment in the formula (1) are illustrated. The aspheric coefficients az of the object-side surface 15 of the first lens element 1 to the image-side surface 76 of the seventh lens element 7 in Formula (1) are all 0. To make the chart concise, the coefficient az is omitted in FIG. 21.

In addition, relations among all important parameters in the optical imaging lens 10 of the fourth embodiment are as shown in FIG. 38 to FIG. 41.

Figures 19A, 19B, 19C, 19D:
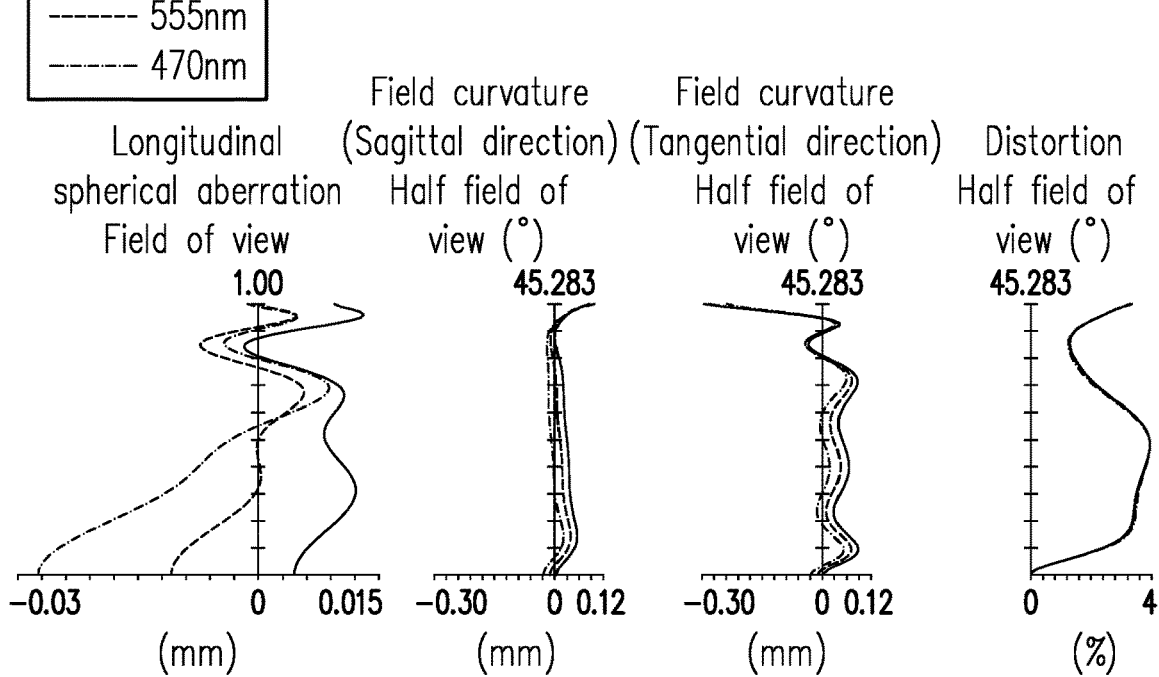
FIG. 19A to FIG. 19D are diagrams of longitudinal spherical aberrations and various aberrations of an optical imaging lens of a fourth embodiment.

In FIG. 19A, which illustrates a longitudinal spherical aberration of the present fourth embodiment, deflections of imaging points of off-axis rays at different heights are controlled within a range of ±0.03 mm. In the two field curvature aberration diagrams of FIG. 19B and FIG. 19C, the field curvature aberrations of three representative wavelengths within an entire field of view range fall within ±0.30 mm. The distortion aberration diagram of FIG. 19D shows that the distortion aberration of the present fourth embodiment is maintained within a range of ±4%. It is indicated accordingly that compared with the existing optical imaging lens, the present fourth embodiment can still provide good imaging quality in the circumstances that the system length has been reduced to about 7.530 mm, the Fno is about 1.700 and the image height is about 5.800 mm.

It can be known from the aforementioned instructions that compared with the first embodiment, the fourth embodiment has the advantages that: the system length (TTL) of the fourth embodiment is shorter than that of the first embodiment, the HFOV of the fourth embodiment is greater than that of the first embodiment, and the longitudinal spherical aberration, the field curvature aberration and the distortion aberration of the fourth embodiment are better than those of the first embodiment.

Figure 22:
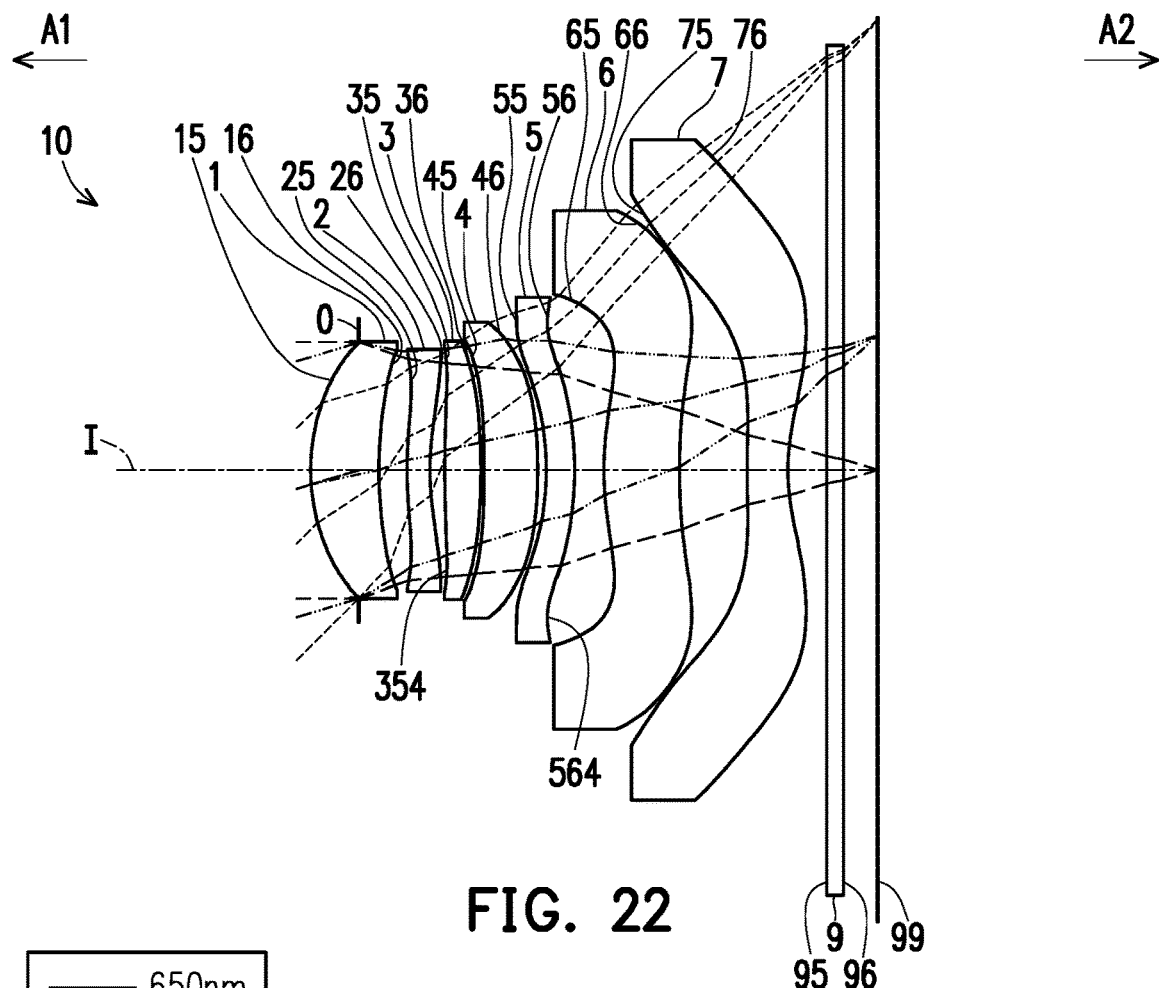
FIG. 22 is a schematic diagram of an optical imaging lens of a fifth embodiment of the invention.

FIG. 22 is a schematic diagram of an optical imaging lens of a fifth embodiment of the invention. FIG. 23A to FIG. 23D are diagrams of longitudinal spherical aberrations and various aberrations of the optical imaging lens of the fifth embodiment. Referring to FIG. 22 at first, the fifth embodiment of the optical imaging lens 10 of the invention is approximately similar to the first embodiment, except that: various optical data, aspheric coefficients, and parameters among the lens elements 1, 2, 3, 4, 5, 6 and 7 are different more or less. In addition, in the present embodiment, the periphery region 354 of the object-side surface 35 of the third lens element 3 is concave; the periphery region 564 of the image-side surface 56 of the fifth lens element 5 is concave, and the Abbe number of the seventh lens element 7 is different (the Abbe number V7 of the seventh lens element 7 in the fifth embodiment is 37.490, and the Abbe number V7 of the seventh lens element 7 in the first embodiment is 21.451). It should be noted that in order to show the drawing clearly, numerals of the optical axis regions and the periphery regions which are similar to those in the first embodiment are omitted in FIG. 22.

Detailed optical data of the optical imaging lens 10 of the fifth embodiment are as shown in FIG. 24, and the optical imaging lens 10 of the fifth embodiment has an EFL of 5.617 mm, an HFOV of 44.857°, a system length (TTL) of 7.302 mm, an Fno of 1.700, and an image height (ImgH) of 5.800 mm.

As shown in FIG. 25, various aspheric coefficients of the object-side surface 15 of the first lens element 1 to the image-side surface 76 of the seventh lens 7 of the fifth embodiment in the formula (1) are illustrated. The aspheric coefficients $a_2$ of the object-side surface 15 of the first lens element 1 to the image-side surface 76 of the seventh lens element 7 in Formula (1) are all 0. To make the chart concise, the coefficient $a_2$ is omitted in FIG. 25.

In addition, relations among all important parameters in the optical imaging lens 10 of the fifth embodiment are as shown in FIG. 38 to FIG. 41.

Figures 23A, 23B, 23C, 23D:
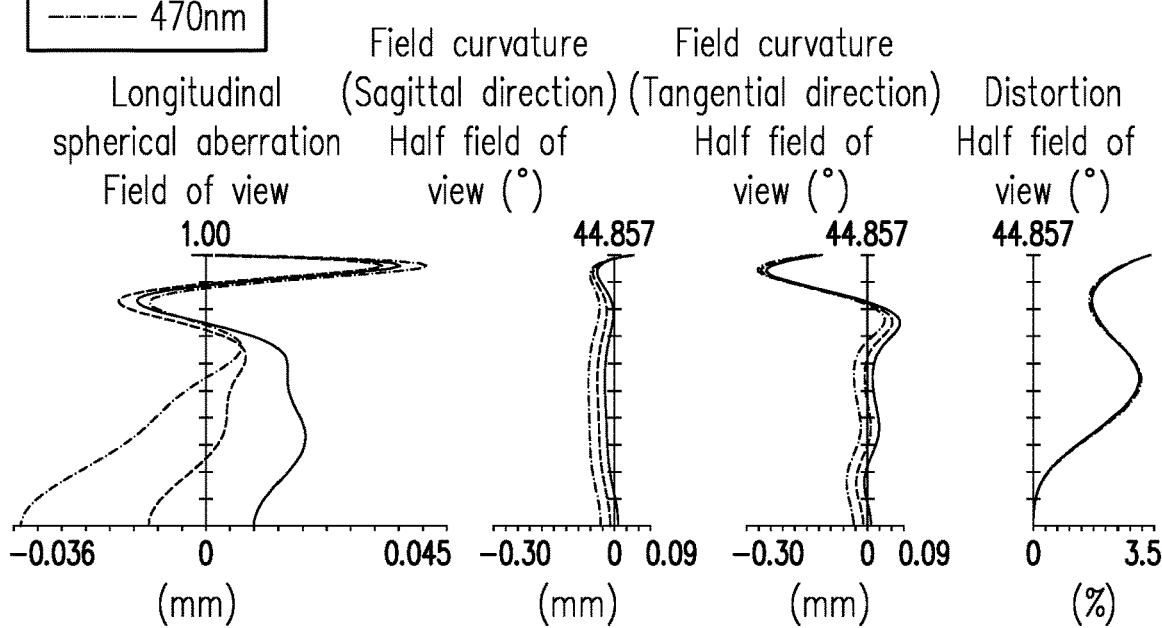
FIG. 23A to FIG. 23D are diagrams of longitudinal spherical aberrations and various aberrations of an optical imaging lens of a fifth embodiment.

In FIG. 23A, which illustrates a longitudinal spherical aberration of the present fifth embodiment, deflections of imaging points of off-axis rays at different heights are controlled within a range of ±0.045 mm. In the two field curvature aberration diagrams of FIG. 23B and FIG. 23C, the field curvature aberrations of three representative wavelengths within an entire field of view range fall within ±0.30 mm. The distortion aberration diagram of FIG. 23D shows that the distortion aberration of the present fifth embodiment is maintained within a range of ±3.5%. It is indicated accordingly that compared with the existing optical imaging lens, the present fifth embodiment can still provide good imaging quality in the circumstances that the system length has been reduced to about 7.302 mm, the Fno is about 1.700 and the image height is about 5.800 mm.

It can be known from the aforementioned instructions that compared with the first embodiment, the fifth embodiment has the advantages that: the system length (TTL) of the fifth embodiment is shorter than that of the first embodiment, the HFOV of the fifth embodiment is greater than that of the first embodiment, and the longitudinal spherical aberration, the field curvature aberration and the distortion aberration of the fifth embodiment are better than those of the first embodiment.

Figure 26:
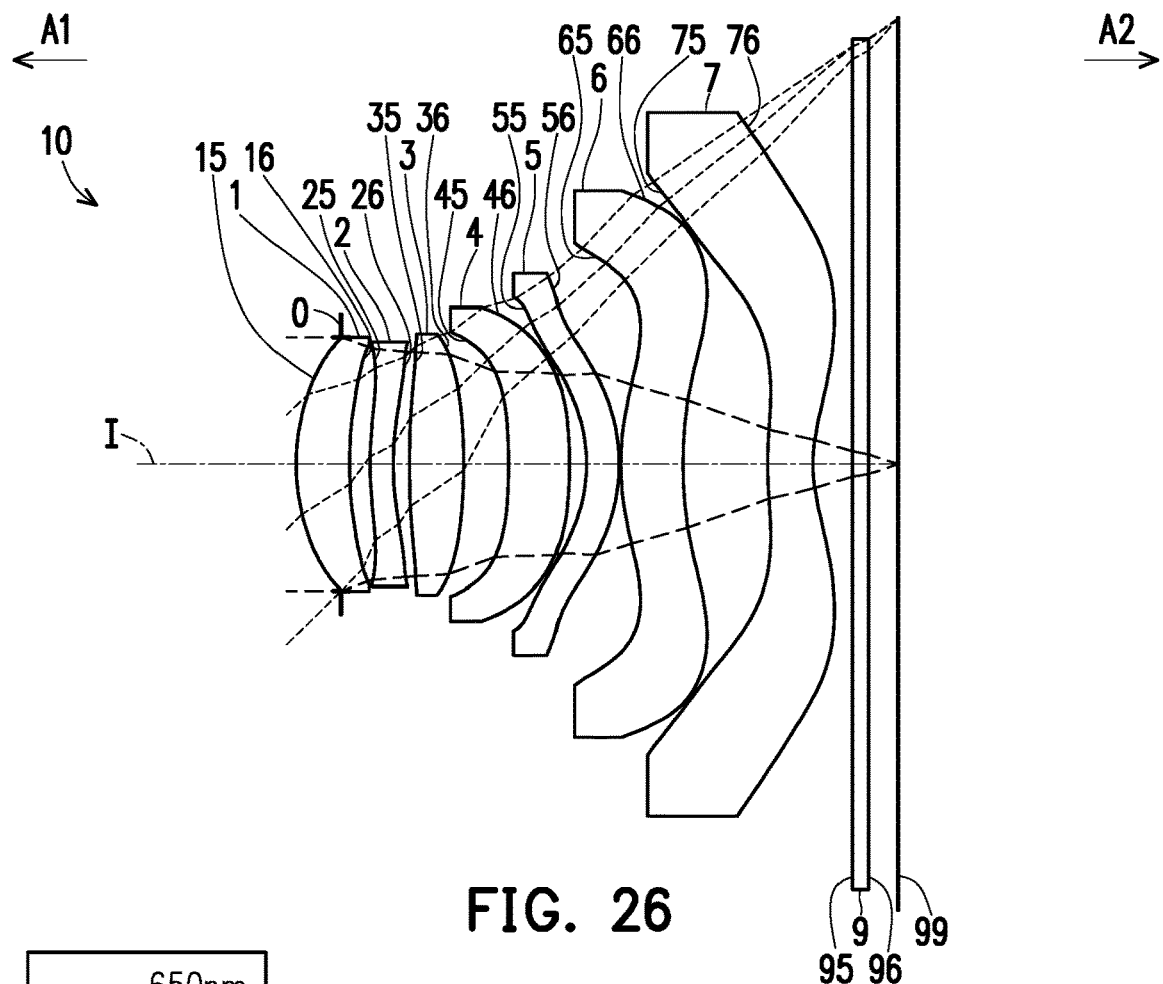
FIG. 26 is a schematic diagram of an optical imaging lens of a sixth embodiment of the invention.

FIG. 26 is a schematic diagram of an optical imaging lens of a sixth embodiment of the invention. FIG. 27A to FIG. 27D are diagrams of longitudinal spherical aberrations and various aberrations of the optical imaging lens of the sixth embodiment. Referring to FIG. 26 at first, the sixth embodiment of the optical imaging lens 10 of the invention is approximately similar to the first embodiment, except that: various optical data, aspheric coefficients, and parameters among the lens elements 1, 2, 3, 4, 5, 6 and 7 are different more or less. It should be noted that in order to show the drawing clearly, numerals of the optical axis regions and the periphery regions which are similar to those in the first embodiment are omitted in FIG. 26.

Detailed optical data of the optical imaging lens 10 of the sixth embodiment are as shown in FIG. 28, and the optical imaging lens 10 of the sixth embodiment has an EFL of 5.547 mm, an HFOV of 44.398°, a system length (TTL) of 7.737 mm, an Fno of 1.700, and an image height (ImgH) of 5.800 mm.

As shown in FIG. 29, various aspheric coefficients of the object-side surface 15 of the first lens element 1 to the image-side surface 76 of the seventh lens 7 of the sixth embodiment in the formula (1) are illustrated. The aspheric coefficients $a_2$ of the object-side surface 15 of the first lens element 1 to the image-side surface 76 of the seventh lens element 7 in Formula (1) are all 0. To make the chart concise, the coefficient $a_2$ is omitted in FIG. 29.

In addition, relations among all important parameters in the optical imaging lens 10 of the sixth embodiment are as shown in FIG. 38 to FIG. 41.

Figures 27A, 27B, 27C, 27D:
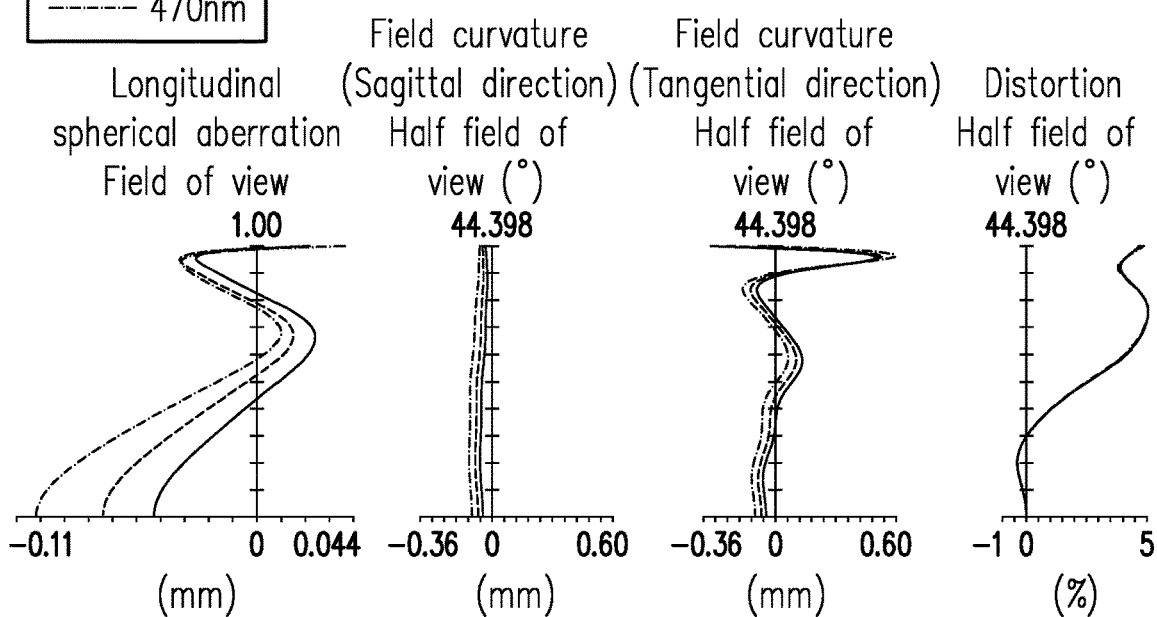
FIG. 27A to FIG. 27D are diagrams of longitudinal spherical aberrations and various aberrations of an optical imaging lens of a sixth embodiment.

In FIG. 27A, which illustrates a longitudinal spherical aberration of the present sixth embodiment, deflections of imaging points of off-axis rays at different heights are controlled within a range of ±0.11 mm. In the two field curvature aberration diagrams of FIG. 27B and FIG. 27C, the field curvature aberrations of three representative wavelengths within an entire field of view range fall within ±0.60 mm. The distortion aberration diagram of FIG. 27D shows that the distortion aberration of the present sixth embodiment is maintained within a range of ±5.5%. It is indicated accordingly that compared with the existing optical imaging lens, the present sixth embodiment can still provide good imaging quality in the circumstances that the system length has been reduced to about 7.737 mm, the Fno is about 1.700 and the image height is about 5.800 mm.

It can be known from the aforementioned instructions that compared with the first embodiment, the sixth embodiment has the advantages that: the system length (TTL) of the sixth embodiment is shorter than that of the first embodiment, the HFOV of the sixth embodiment is greater than that of the first embodiment, and the longitudinal spherical aberration, the field curvature aberration and the distortion aberration of the sixth embodiment are better than those of the first embodiment.

FIG. 30 is a schematic diagram of an optical imaging lens of a seventh embodiment of the invention. FIG. 31A to FIG. 31D are diagrams of longitudinal spherical aberrations and various aberrations of the optical imaging lens of the seventh embodiment. Referring to FIG. 30 at first, the seventh embodiment of the optical imaging lens 10 of the invention is approximately similar to the first embodiment, except that: various optical data, aspheric coefficients, and parameters among the lens elements 1, 2, 3, 4, 5, 6 and 7 are different more or less. The fifth lens element 5 has positive refracting power. In addition, in the present embodiment, the periphery region 454 of the object-side surface 45 of the fourth lens element 4 is convex, and the periphery region 564 of the image-side surface 56 of the fifth lens element 5 is concave. It should be noted that in order to show the drawing clearly, numerals of the optical axis regions and the periphery regions which are similar to those in the first embodiment are omitted in FIG. 30.

Detailed optical data of the optical imaging lens 10 of the seventh embodiment are as shown in FIG. 32, and the optical imaging lens 10 of the seventh embodiment has an EFL of 5.668 mm, an HFOV of 42.634°, a system length (TTL) of 7.588 mm, an Fno of 1.700, and an image height (ImgH) of 5.800 mm.

As shown in FIG. 33, various aspheric coefficients of the object-side surface 15 of the first lens element 1 to the image-side surface 76 of the seventh lens 7 of the seventh embodiment in the formula (1) are illustrated. The aspheric coefficients $a_2$ of the object-side surface 15 of the first lens element 1 to the image-side surface 76 of the seventh lens element 7 in Formula (1) are all 0. To make the chart concise, the coefficient $a_2$ is omitted in FIG. 33.

In addition, relations among all important parameters in the optical imaging lens 10 of the seventh embodiment are as shown in FIG. 38 to FIG. 41.

In FIG. 31A, which illustrates a longitudinal spherical aberration of the present seventh embodiment, deflections of imaging points of off-axis rays at different heights are controlled within a range of ±0.24 mm. In the two field curvature aberration diagrams of FIG. 31B and FIG. 31C, the field curvature aberrations of three representative wavelengths within an entire field of view range fall within ±0.35 mm. The distortion aberration diagram of FIG. 31D shows that the distortion aberration of the present seventh embodiment is maintained within a range of ±6%. It is indicated accordingly that compared with the existing optical imaging lens, the present seventh embodiment can still provide good imaging quality in the circumstances that the system length has been reduced to about 7.588 mm, the Fno is about 1.700 and the image height is about 5.800 mm.

It can be known from the aforementioned instructions that compared with the first embodiment, the seventh embodiment has the advantages that: the system length (TTL) of the seventh embodiment is shorter than that of the first embodiment, the HFOV of the seventh embodiment is greater than that of the first embodiment, and the longitudinal spherical aberration, the field curvature aberration and the distortion aberration of the seventh embodiment are better than those of the first embodiment.

Figure 34:
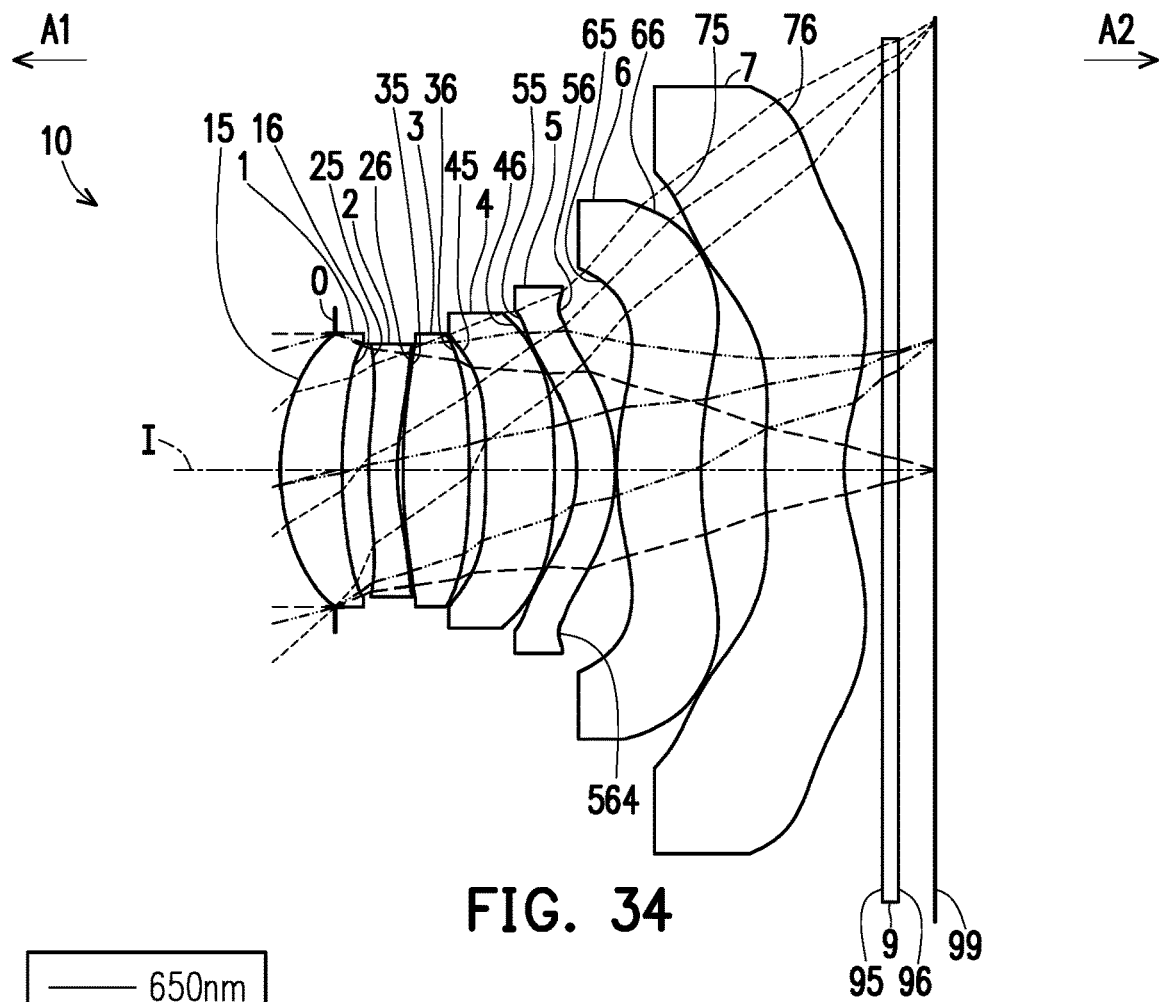
FIG. 34 is a schematic diagram of an optical imaging lens of an eighth embodiment of the invention.

FIG. 34 is a schematic diagram of an optical imaging lens of an eighth embodiment of the invention. FIG. 35A to FIG. 35D are diagrams of longitudinal spherical aberrations and various aberrations of the optical imaging lens of the eighth embodiment. Referring to FIG. 34 at first, the eighth embodiment of the optical imaging lens 10 of the invention is approximately similar to the first embodiment, except that: various optical data, aspheric coefficients, and parameters among the lens elements 1, 2, 3, 4, 5, 6 and 7 are different more or less. In addition, in the present embodiment, the periphery region 564 of the image-side surface 56 of the fifth lens element 5 is concave. It should be noted that in order to show the drawing clearly, numerals of the optical axis regions and the periphery regions which are similar to those in the first embodiment are omitted in FIG. 34.

Detailed optical data of the optical imaging lens 10 of the eighth embodiment are as shown in FIG. 36, and the optical imaging lens 10 of the eighth embodiment has an EFL of 6.046 mm, an HFOV of 42.021°, a system length (TTL) of 8.511 mm, an Fno of 1.700, and an image height (ImgH) of 5.800 mm.

As shown in FIG. 37, various aspheric coefficients of the object-side surface 15 of the first lens element 1 to the image-side surface 76 of the seventh lens 7 of the eighth embodiment in the formula (1) are illustrated. The aspheric coefficients $a_2$ of the object-side surface 15 of the first lens element 1 to the image-side surface 76 of the seventh lens element 7 in Formula (1) are all 0. To make the chart concise, the coefficient $a_2$ is omitted in FIG. 37.

In addition, relations between all important parameters in the optical imaging lens 10 of the eighth embodiment are as shown in FIG. 38 to FIG. 41.

Figures 35A, 35B, 35C, 35D:
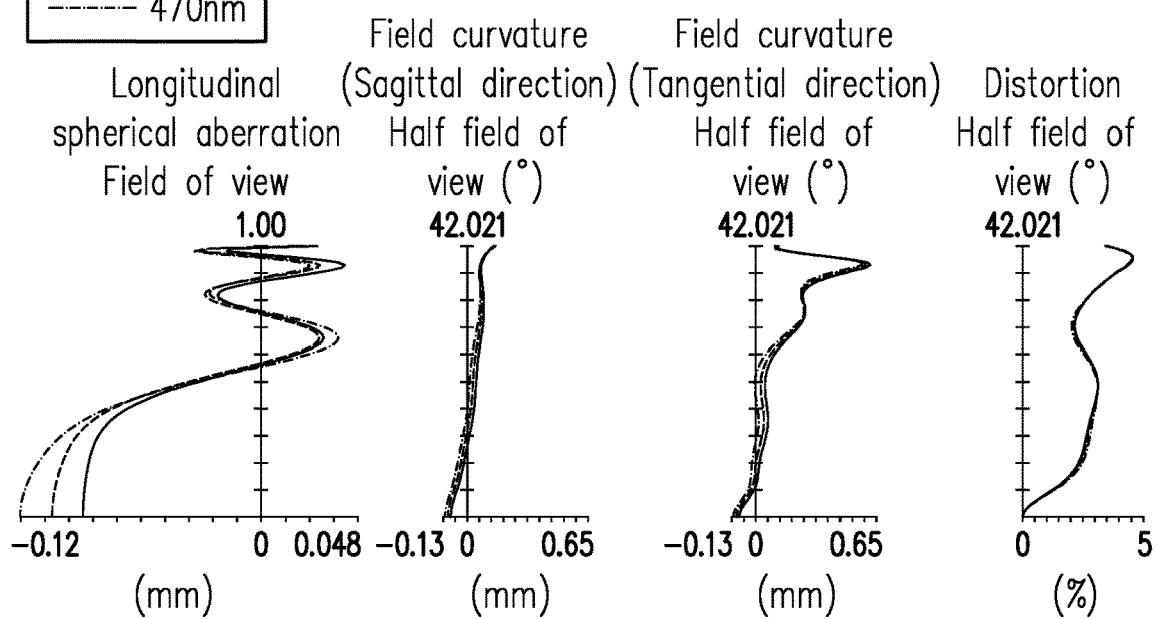
FIG. 35A to FIG. 35D are diagrams of longitudinal spherical aberrations and various aberrations of an optical imaging lens of an eighth embodiment.

In FIG. 35A, which illustrates a longitudinal spherical aberration of the present eighth embodiment, deflections of imaging points of off-axis rays at different heights are controlled within a range of ±0.12 mm. In the two field curvature aberration diagrams of FIG. 35B and FIG. 35C, the field curvature aberrations of three representative wavelengths within an entire field of view range fall within ±0.65 mm. The distortion aberration diagram of FIG. 35D shows that the distortion aberration of the present eighth embodiment is maintained within a range of ±5%. It is indicated accordingly that compared with the existing optical imaging lens, the present eighth embodiment can still provide good imaging quality in the circumstances that the system length has been reduced to about 8.511 mm, the Fno is about 1.700 and the image height is about 5.800 mm.

It can be known from the aforementioned instructions that compared with the first embodiment, the eighth embodiment has the advantages that: the system length (TTL) of the eighth embodiment is shorter than that of the first embodiment, the HFOV of the eighth embodiment is greater than that of the first embodiment, and the longitudinal spherical aberration and the distortion aberration of the eighth embodiment are better than those of the first embodiment.

Referring to FIG. 38 to FIG. 41 cooperatively, tabular diagrams of various optical parameters of the foregoing first embodiment to eighth embodiment are illustrated.

The designer can be assisted in designing a technically feasible optical imaging lens that has a large aperture, a greater image height, good optical performance and effectively reduced entire length via numerical value control of all the following parameters:

The optical imaging lenses of the embodiments of the invention satisfy the conditions that the fourth lens element has positive refracting power, the optical axis region of the object-side surface of the fourth lens element is concave, the optical axis region of the image-side surface of the fifth lens element is convex, D21t61/D61t72≤1.300 and V7≤40.000, and also satisfy the conditions that (a) the first lens element has positive refracting power or the optical axis region of the object-side surface of the first lens element is convex, and (b) the periphery region of the image-side surface of the second lens element is concave or the optical axis region of the object-side surface of the seventh lens element is convex, so that it is beneficial to increase the aperture and the image height and reduce the system length. Better limitations are 0.800≤D21t61/D61t72≤1.300 and 19.000≤V7≤40.000.

The optical imaging lenses of the embodiments of the invention satisfy the conditions that the first lens element has positive refracting power, the periphery region of the image-side surface of the first lens element is concave, the periphery region of the object-side surface of the second lens element is concave, the optical axis region of the object-side surface of the seventh lens is convex, D21t61/D61t72≤1.300 and V5+V6+V7≤115.000, and also satisfy the conditions that (c) the optical axis region of the object-side surface of the second lens element is convex, and the optical axis region of the image-side surface of the second lens element is concave or the periphery region of the image-side surface of the second lens element is concave, and (d) the optical axis region of the object-side surface of the fourth lens element is concave or the optical axis region of the image-side surface of the fourth lens element is convex, so that it is beneficial to increase the aperture and the image height and reduce the system length. Better limitations are $0.800 \leq D21t61/D61t72 \leq 1.300$ and $57.000 \leq V5+V6+V7 \leq 115.000$.

The optical imaging lenses of the embodiments of the invention satisfy the conditions that the first lens element has positive refracting power, the periphery region of the image-side surface of the first lens element is concave, the periphery region of the image-side surface of the third lens element is convex, the optical axis region of the object-side surface of the fourth lens element is concave, the optical axis region of the image-side surface of the fifth lens element is convex, the optical axis region of the object-side surface of the seventh lens element is convex, $D21t61/D61t72 \leq 1.600$ and $V5+V6+V7 \leq 115.000$, and also satisfy the conditions that (c) the optical axis region of the object-side surface of the second lens element is convex, and the optical axis region of the image-side surface of the second lens element is concave or the periphery region of the image-side surface of the second lens element is concave, so that it is beneficial to increase the aperture and the image height and reduce the system length. Better limitations are $0.800 \leq D21t61/D61t72 \leq 1.600$ and $57.000 \leq V5+V6+V7 \leq 115.000$.

The optical imaging lenses of the embodiments of the invention satisfy the conditions that the optical axis region of the object-side surface of the first lens element is convex, the periphery region of the image-side surface of the first lens element is concave, the periphery region of the image-side surface of the second lens element is concave, the optical axis region of the image-side surface of the third lens element is convex, the fourth lens element has positive refracting power, the optical axis region of the object-side surface of the seventh lens element is convex, and $ImgH/D21t61 \geq 1.800$, and also satisfy the conditions that (e) the optical axis region of the object-side surface of the fourth lens element is concave or the optical axis region of the image-side surface of the fifth lens element is convex, so that it is beneficial to increase the aperture and image height and reduce the system length. A better limitation is $2.800 \geq ImgH/D21t61 \geq 1.800$.

The optical imaging lenses of the embodiments of the invention further satisfy the following conditional expressions to contribute to maintaining the thickness and gap of each lens element at appropriate values to avoid a situation that any parameter is too large, which is not conductive to the thinning of the entire optical imaging lens, or a situation that any parameter is too small, which affects the assembling or increases the difficulty in manufacturing.

$1.200 \leq (EFL+ALT)/ImgH \leq 2.000$ $3.150 \leq TTL/(T3+T5+T7) \leq 5.400$ $2.400 \leq TL*Fno/(T3+G34+G45+T5+G67+T7) \leq 4.400$ $2.000 \leq D21t42/(G12+G45) \leq 5.300$ $0.900 \leq D41t62/(G67+T7) \leq 1.800$ $2.200 \leq (T2+T4+T6+BFL)/(T1+G12) \leq 3.300$ $1.600 \leq (EFL+TL)/ImgH \leq 2.500$ $1.700 \leq ALT/(G67+T7) \leq 3.000$ $2.400 \leq EFL/(T1+G12+G45+T5) \leq 3.900$ $2.000 \leq TL/(D31t42+G67) \leq 3.100$ $1.200 \leq (T2+T4+G56+T6)/(T1+T5) \leq 1.900$ $0.900 \leq (T2+G23+T4+G45+T6)/(T3+G67) \leq 2.700$ $1.700 \leq (EFL+TTL)/ImgH \leq 2.700$ $2.400 \leq (AAG+T2+T6)/(T4+G45) \leq 4.700$ $1.100 \leq (T2+G23+G34+G56+T6)/(T3+T5) \leq 2.700$ $1.000 \leq (T2+G23+G34+G56+T6)/(T4+T5) \leq 2.200$ $8.000 \leq Fno*ALT/(G12+G45) \leq 15.000$ $1.200 \leq Fno*(T1+T2+T6)/(G45+G67+T7) \leq 2.500$ In addition, any combination relationships of the parameters of the embodiments may be additionally selected to add limits to the optical imaging lens, so as to facilitate the optical imaging lens design of the same architecture of the invention.

In view of the unpredictability of an optical system design, under the architecture of the invention, the optical imaging lens, satisfying the foregoing conditional expressions, of the invention may have a reduced system length, an increased available aperture, improved imaging quality or increased assembling yield to improve the defect in the prior art.

The above-listed exemplary limitation relational expressions can also be arbitrarily selectively incorporated in unequal numbers to be applied to the embodiments of the invention, and they are not limited thereto. During the implementation of the invention, in addition to the aforementioned relational expressions, detailed structures, such as the arrangement of concave and convex surfaces, of other more lenses can also be designed for a single lens element or broadly for a plurality of lens elements to enhance the system performance and/or control of the resolution. It should be noted that these details need to be selectively incorporated in other embodiments of the invention without conflicts.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

The invention has been disclosed above with embodiments; however, the embodiments are not intended to limit the invention. Any person of ordinary skill in the art can make some changes and modifications without departing from the spirit and scope of the invention. Thus, the protection scope of the invention should be subject to that defined by the appended claims.

What is claimed is:

1. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing imaging rays to pass through and an image-side surface facing the image side and allowing the imaging rays to pass through; wherein:
   an optical axis region of the object-side surface of the first lens element is convex;
   a periphery region of the image-side surface of the second lens element is concave;
   the fourth lens element has positive refracting power, and an optical axis region of the object-side surface of the fourth lens element is concave;
   an optical axis region of the image-side surface of the fifth lens element is convex; and
   lens elements of the optical imaging lens are only the seven lens elements, and the optical imaging lens satisfies following conditional expressions:

$D21t61/D61t72 \leq 1.300$;

$V7 \leq 40.000$; and $D41t62/(G67+T7) \leq 1.800$;

where D21t61 is a distance from the object-side surface of the second lens element to the object-side surface of the sixth lens element on the optical axis, D61t72 is a distance from the object-side surface of the sixth lens element to the image-side surface of the seventh lens element on the optical axis, V7 is an Abbe number of the seventh lens element, D41t62 is a distance from the object-side surface of the fourth lens element to the image-side surface of the sixth lens element on the optical axis, G67 is a distance from the image-side surface of the sixth lens element to the object-side surface of the seventh lens element on the optical axis, and T7 is a thickness of the seventh lens element on the optical axis.

2. The optical imaging lens according to claim 1, wherein the optical imaging lens further satisfies: $(EFL+ALT)/ImgH \leq 2.000$, where EFL is an effective focal length of the optical imaging lens, ALT is a sum of thicknesses of the seven lens elements from the first lens element to the seventh lens element on the optical axis, and ImgH is an image height of the optical imaging lens.

3. The optical imaging lens according to claim 1, wherein the optical imaging lens further satisfies: $TTL/(T3+T5+T7) \leq 5.400$, where TTL is a distance from the object-side surface of the first lens element to an image plane on the optical axis, T3 is a thickness of the third lens element on the optical axis, and T5 is a thickness of the fifth lens element on the optical axis.

4. The optical imaging lens according to claim 1, wherein the optical imaging lens further satisfies: $TL*Fno/(T3+G34+G45+T5+G67+T7) \leq 4.400$, where TL is a distance from the object-side surface of the first lens element to the image-side surface of the seventh lens element on the optical axis, Fno is an F-number of the optical imaging lens, T3 is a thickness of the third lens element on the optical axis, G34 is a distance from the image-side surface of the third lens element to the object-side surface of the fourth lens element on the optical axis, G45 is a distance from the image-side surface of the fourth lens element to the object-side surface of the fifth lens element on the optical axis, and T5 is a thickness of the fifth lens element on the optical axis, G67 is a distance from the image side surface of the sixth lens element to the object side surface of the seventh lens element on the optical axis.

5. The optical imaging lens according to claim 1, wherein the optical imaging lens further satisfies: $D21t42/(G12+G45) \leq 5.300$, where D21t42 is a distance from the object-side surface of the second lens element to the image-side surface of the fourth lens element on the optical axis, G12 is a distance from the image-side surface of the first lens element to the object-side surface of the second lens element on the optical axis, and G45 is a distance from the image-side surface of the fourth lens element to the object-side surface of the fifth lens element on the optical axis.

6. The optical imaging lens according to claim 1, wherein the optical imaging lens further satisfies: $(T2+T4+T6+BFL)/(T1+G12) \leq 3.300$, where T2 is a thickness of the second lens element on the optical axis, T4 is a thickness of the fourth lens element on the optical axis, T6 is a thickness of the sixth lens element on the optical axis, BFL is a distance from the image-side surface of the seventh lens element to an image plane on the optical axis, T1 is a thickness of the first lens element on the optical axis, and G12 is a distance from the image-side surface of the first lens element to the object-side surface of the second lens element on the optical axis.

7. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing imaging rays to pass through and an image-side surface facing the image side and allowing the imaging rays to pass through; wherein:
- an optical axis region of the object-side surface of the first lens element is convex;
- the fourth lens element has positive refracting power, and an optical axis region of the object-side surface of the fourth lens element is concave;
- an optical axis region of the image-side surface of the fifth lens element is convex;
- an optical axis region of the object-side surface of the seventh lens element is convex; and
- lens elements of the optical imaging lens are only the seven lens elements, and the optical imaging lens satisfies following conditional expressions:

$D21t61/D61t72 \le 1.300$;

$V7 \le 40.000$; and $TL/(D31t42+G67) \le 3.100$;

wherein D21t61 is a distance from the object-side surface of the second lens element to the object-side surface of the sixth lens element on the optical axis, D61t72 is a distance from the object-side surface of the sixth lens element to the image-side surface of the seventh lens element on the optical axis, V7 is an Abbe number of the seventh lens element, TL is a distance from the object-side surface of the first lens element to the image-side surface of the seventh lens element on the optical axis, D31t42 is a distance from the object-side surface of the third lens element to the image-side surface of the fourth lens element on the optical axis, and G67 is a distance from the image-side surface of the sixth lens element to the object-side surface of the seventh lens element on the optical axis.

8. The optical imaging lens according to claim 7, wherein the optical imaging lens further satisfies: $(EFL+TL)/ImgH \le 2.500$, where EFL is an effective focal length of the optical imaging lens, and ImgH is an image height of the optical imaging lens.

9. The optical imaging lens according to claim 7, wherein the optical imaging lens further satisfies: $ALT/(G67+T7) \le 3.000$, where ALT is a sum of thicknesses of the seven lens elements from the first lens element to the seventh lens element on the optical axis, and T7 is a thickness of the seventh lens element on the optical axis.

10. The optical imaging lens according to claim 7, wherein the optical imaging lens further satisfies: $EFL/(T1+G12+G45+T5) \le 3.900$, where EFL is an effective focal length of the optical imaging lens, T1 is a thickness of the first lens element on the optical axis, G12 is a distance from the image-side surface of the first lens element to the object-side surface of the second lens element on the optical axis, G45 is a distance from the image-side surface of the fourth lens element to the object-side surface of the fifth lens element on the optical axis, and T5 is a thickness of the fifth lens element on the optical axis.

11. The optical imaging lens according to claim 7, wherein the optical imaging lens further satisfies: $(T2+T4+G56+T6)/(T1+T5) \le 1.900$, where T2 is a thickness of the second lens element on the optical axis, T4 is a thickness of the fourth lens element on the optical axis, G56 is a distance from the image-side surface of the fifth lens element to the object-side surface of the sixth lens element on the optical axis, T6 is a thickness of the sixth lens element on the optical axis, T1 is a thickness of the first lens element on the optical axis, and T5 is a thickness of the fifth lens element on the optical axis.

12. The optical imaging lens according to claim 7, wherein the optical imaging lens further satisfies: $(T2+G23+T4+G45+T6)/(T3+G67) \le 2.700$, where T2 is a thickness of the second lens element on the optical axis, G23 is a distance from the image-side surface of the second lens element to the object-side surface of the third lens element on the optical axis, T4 is a thickness of the fourth lens element on the optical axis, G45 is a distance from the image-side surface of the fourth lens element to the object-side surface of the fifth lens element on the optical axis, T6 is a thickness of the sixth lens element on the optical axis, and T3 is a thickness of the third lens element on the optical axis.

13. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing imaging rays to pass through and an image-side surface facing the image side and allowing the imaging rays to pass through; wherein:
- the first lens element has positive refracting power, and a periphery region of the image-side surface of the first lens element is concave;
- a periphery region of the object-side surface of the second lens element is concave, and a periphery region of the image-side surface of the second lens element is concave;
- an optical axis region of the image-side surface of the fourth lens element is convex;
- an optical axis region of the object-side surface of the seventh lens element is convex;
- lens elements of the optical imaging lens are only the seven lens elements, and the optical imaging lens satisfies following conditional expressions:

$D21t61/D61t72 \le 1.300$;

$V5+V6+V7 \le 115.000$; and $D41t62/(G67+T7) \le 1.800$;

wherein D21t61 is a distance from the object-side surface of the second lens element to the object-side surface of the sixth lens element on the optical axis, D61t72 is a distance from the object-side surface of the sixth lens element to the image-side surface of the seventh lens element on the optical axis, V5 is an Abbe number of the fifth lens element, V6 is an Abbe number of the sixth lens element, V7 is an Abbe number of the seventh lens element, D41t62 is a distance from the object-side surface of the fourth lens element to the image-side surface of the sixth lens element on the optical axis, G67 is a distance from the image-side surface of the sixth lens element to the object-side surface of the seventh lens element on the optical axis, and T7 is a thickness of the seventh lens element on the optical axis.

14. The optical imaging lens according to claim 13, wherein the optical imaging lens further satisfies: $(AAG+T2+T6)/(T4+G45) \le 4.700$, where AAG is a sum of six air gaps from the first lens element to the seventh lens element on the optical axis, T2 is a thickness of the second lens element on the optical axis, T6 is a thickness of the sixth lens element on the optical axis, T4 is a thickness of the fourth lens element on the optical axis, and G45 is a distance from the image-side surface of the fourth lens element to the object-side surface of the fifth lens element on the optical axis.

15. The optical imaging lens according to claim 13, wherein the optical imaging lens further satisfies: $(T2+G23+G34+G56+T6)/(T3+T5) \leq 2.700$, where T2 is a thickness of the second lens element on the optical axis, G23 is a distance from the image-side surface of the second lens element to the object-side surface of the third lens element on the optical axis, G34 is a distance from the image-side surface of the third lens element to the object-side surface of the fourth lens element on the optical axis, G56 is a distance from the image-side surface of the fifth lens element to the object-side surface of the sixth lens element on the optical axis, T6 is a thickness of the sixth lens element on the optical axis, T3 is a thickness of the third lens element on the optical axis, and T5 is a thickness of the fifth lens element on the optical axis.

16. The optical imaging lens according to claim 13, wherein the optical imaging lens further satisfies: $(T2+G23+G34+G56+T6)/(T4+T5) \leq 2.200$, where T2 is a thickness of the second lens element on the optical axis, G23 is a distance from the image-side surface of the second lens element to the object-side surface of the third lens element on the optical axis, G34 is a distance from the image-side surface of the third lens element to the object-side surface of the fourth lens element on the optical axis, G56 is a distance from the image-side surface of the fifth lens element to the object-side surface of the sixth lens element on the optical axis, T6 is a thickness of the sixth lens element on the optical axis, T4 is a thickness of the fourth lens element on the optical axis, and T5 is a thickness of the fifth lens element on the optical axis.

17. The optical imaging lens according to claim 13, wherein the optical imaging lens further satisfies: $Fno*ALT/(G12+G45) \leq 15.000$, where Fno is an F-number of the optical imaging lens, ALT is a sum of thicknesses of the seven lens elements from the first lens element to the seventh lens element on the optical axis, G12 is a distance from the image-side surface of the first lens element to the object-side surface of the second lens element on the optical axis, and G45 is a distance from the image-side surface of the fourth lens element to the object-side surface of the fifth lens element on the optical axis.

18. The optical imaging lens according to claim 13, wherein the optical imaging lens further satisfies: $Fno*(T1+T2+T6)/(G45+G67+T7) \leq 2.500$, where Fno is an F-number of the optical imaging lens, T1 is a thickness of the first lens element on the optical axis, T2 is a thickness of the second lens element on the optical axis, T6 is a thickness of the sixth lens element on the optical axis, and G45 is a distance from the image-side surface of the fourth lens element to the object-side surface of the fifth lens element on the optical axis.

* * * * *